April 1, 1969            H. K. FARR            3,436,721

FAN BEAM ACOUSTIC DOPPLER NAVIGATION SYSTEM

Filed Jan. 16, 1968

*INVENTOR.*
HAROLD K. FARR

BY *James and Franklin*

ATTORNEYS

April 1, 1969     H. K. FARR     3,436,721
FAN BEAM ACOUSTIC DOPPLER NAVIGATION SYSTEM
Filed Jan. 16, 1968     Sheet 3 of 11
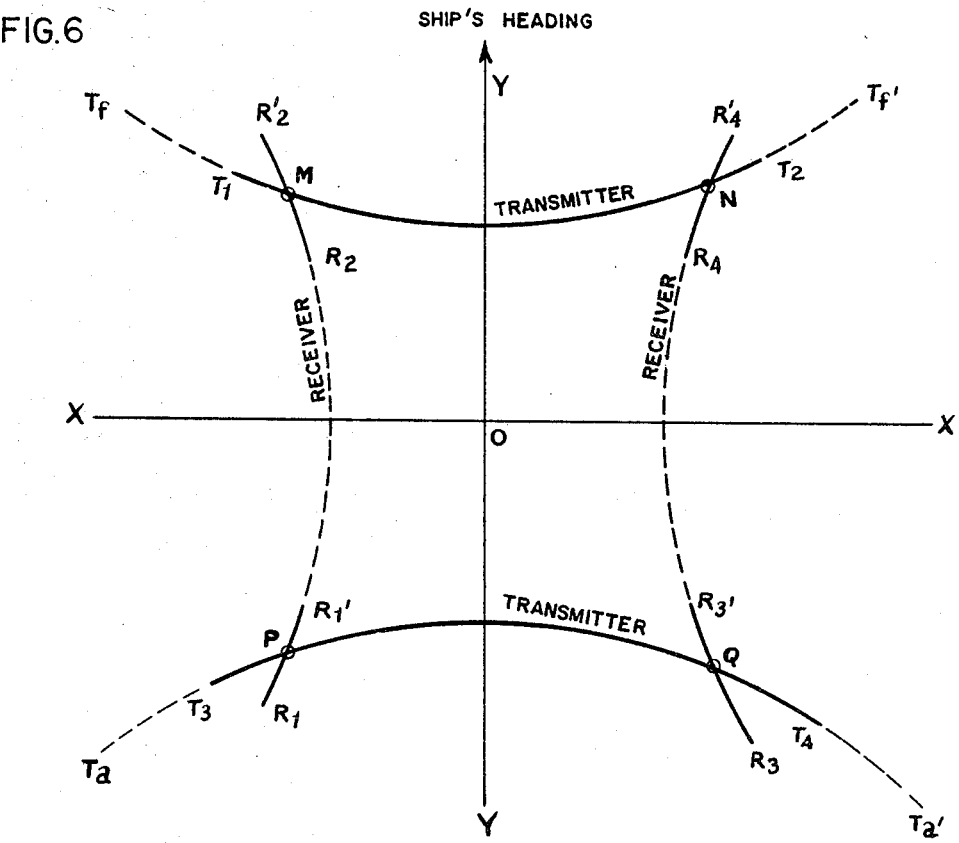
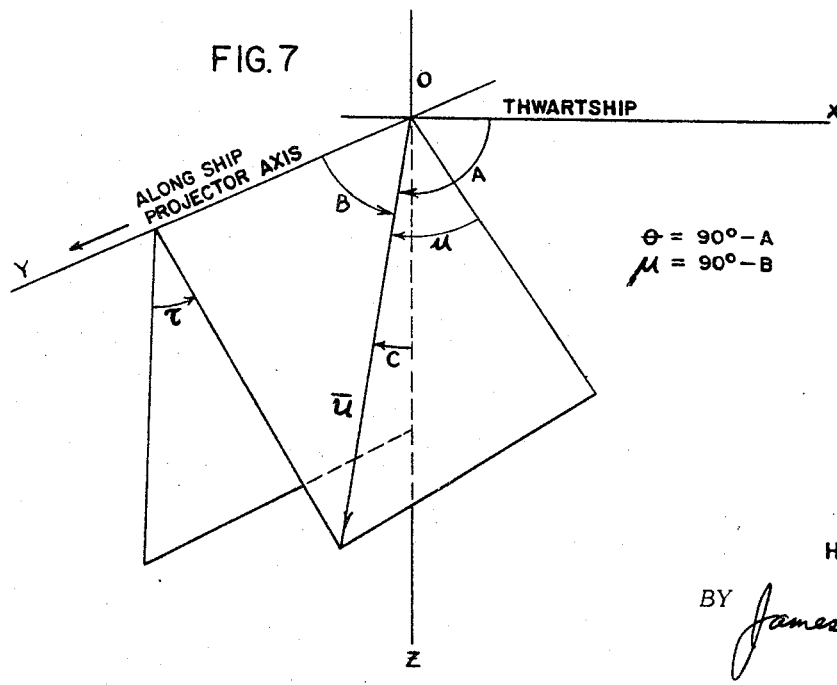
$\theta = 90° - A$
$\mu = 90° - B$
*INVENTOR.*
HAROLD K. FARR
BY *James and Franklin*
ATTORNEYS

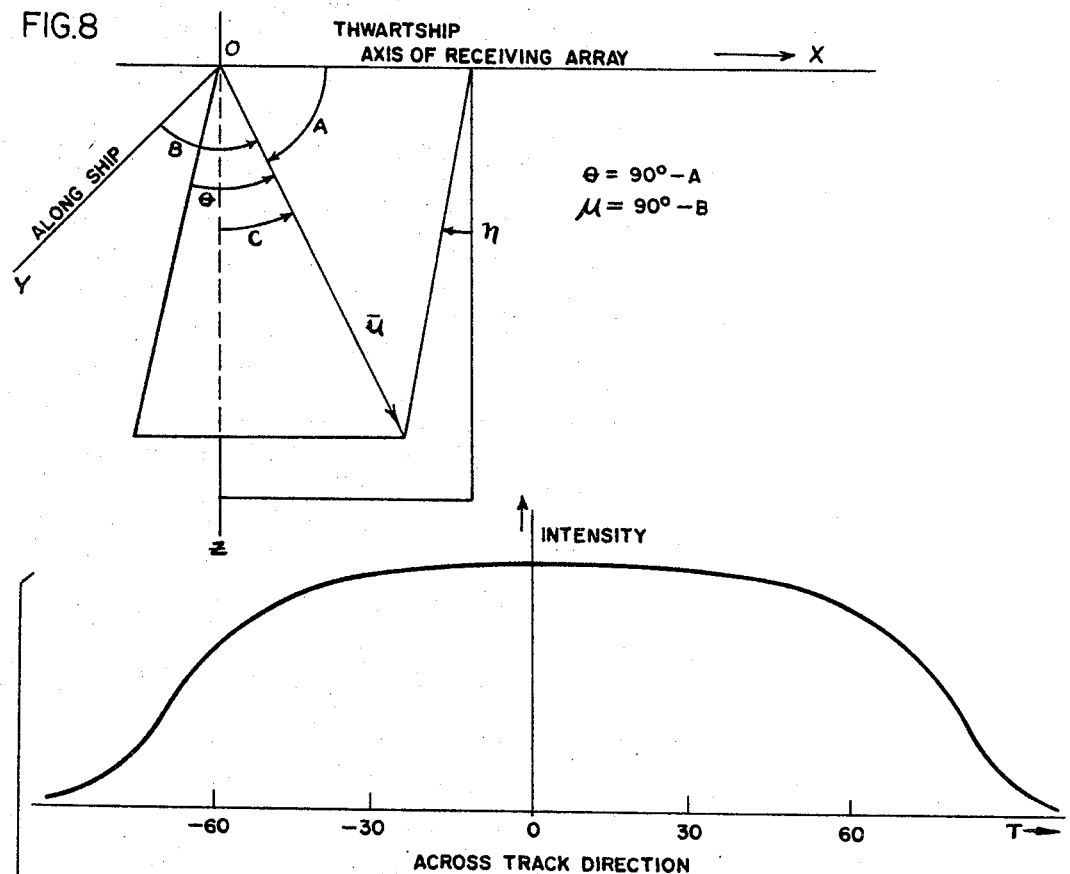
FIG.8
FIG.9
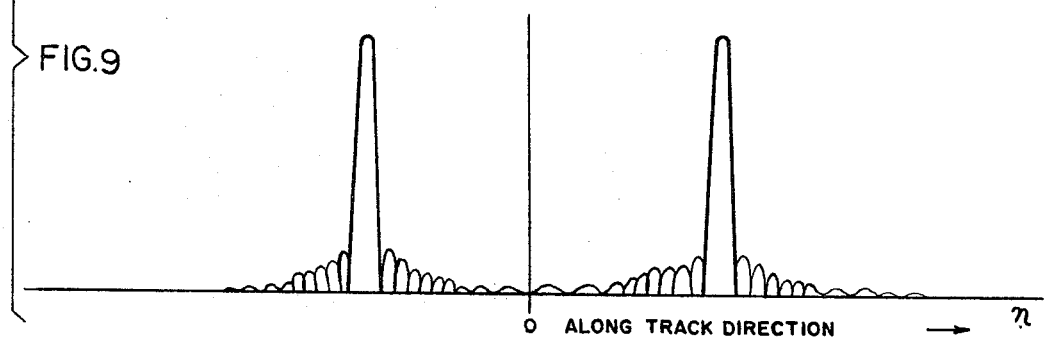
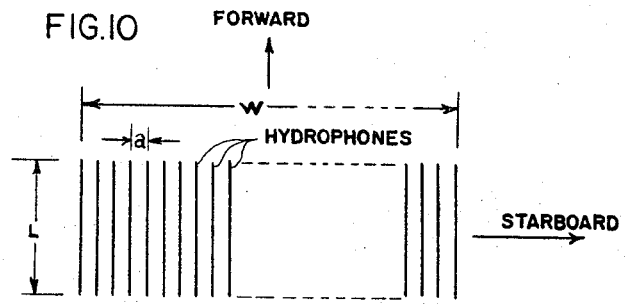
FIG.10
INVENTOR.
HAROLD K. FARR

April 1, 1969   H. K. FARR   3,436,721
FAN BEAM ACOUSTIC DOPPLER NAVIGATION SYSTEM
Filed Jan. 16, 1968   Sheet 5 of 11
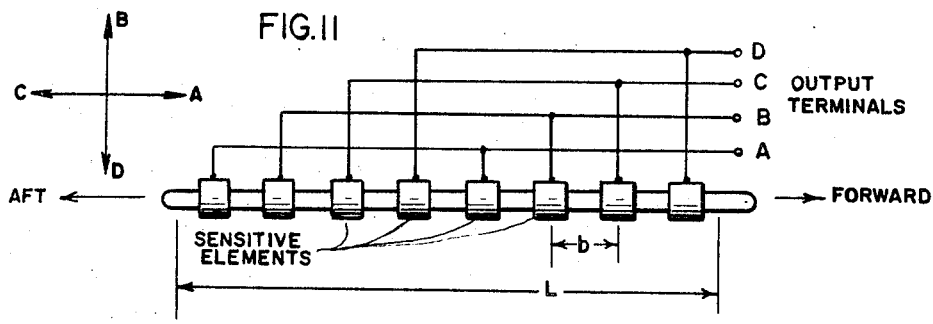
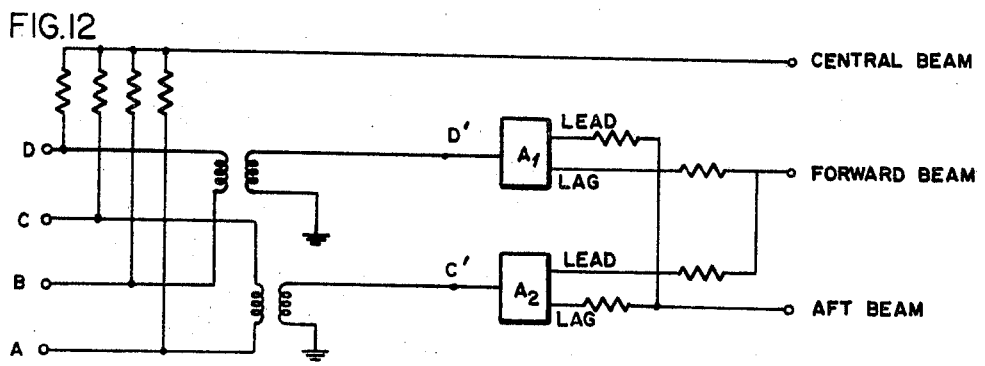
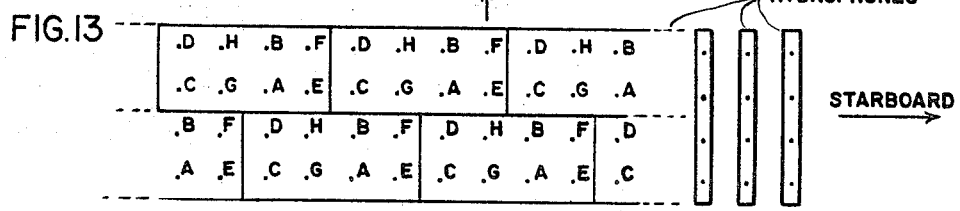
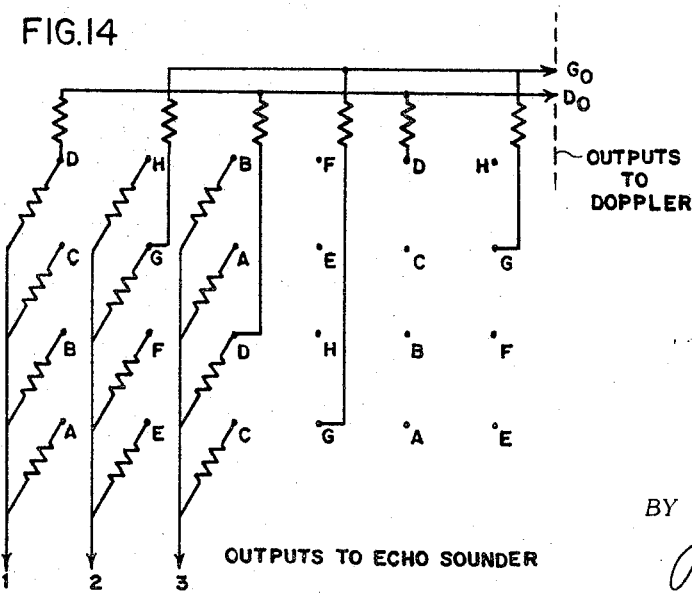
*INVENTOR.*
HAROLD K. FARR
BY *James and Franklin*
ATTORNEYS

*INVENTOR.*
HAROLD K. FARR

*INVENTOR.*
HAROLD K. FARR

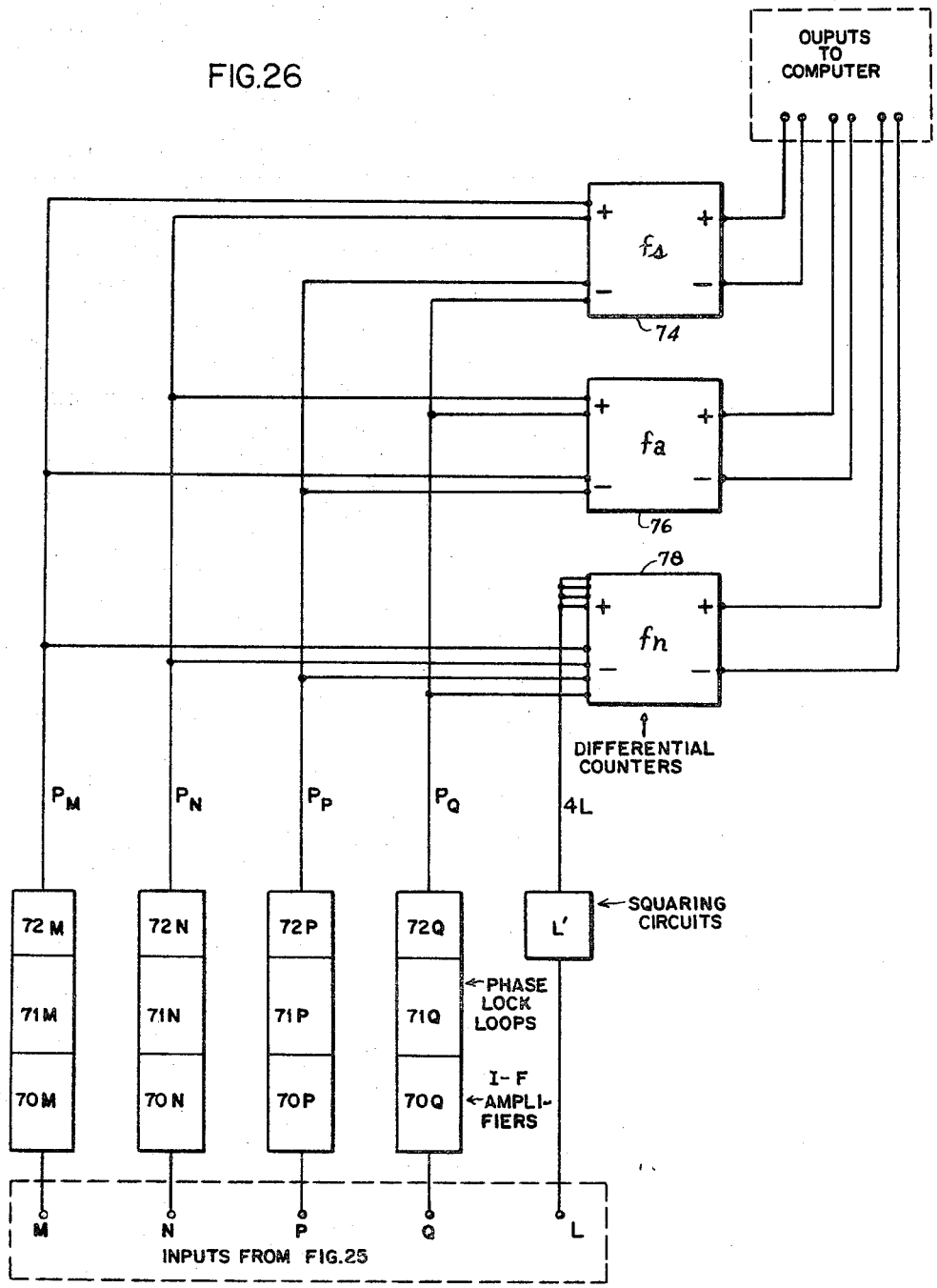

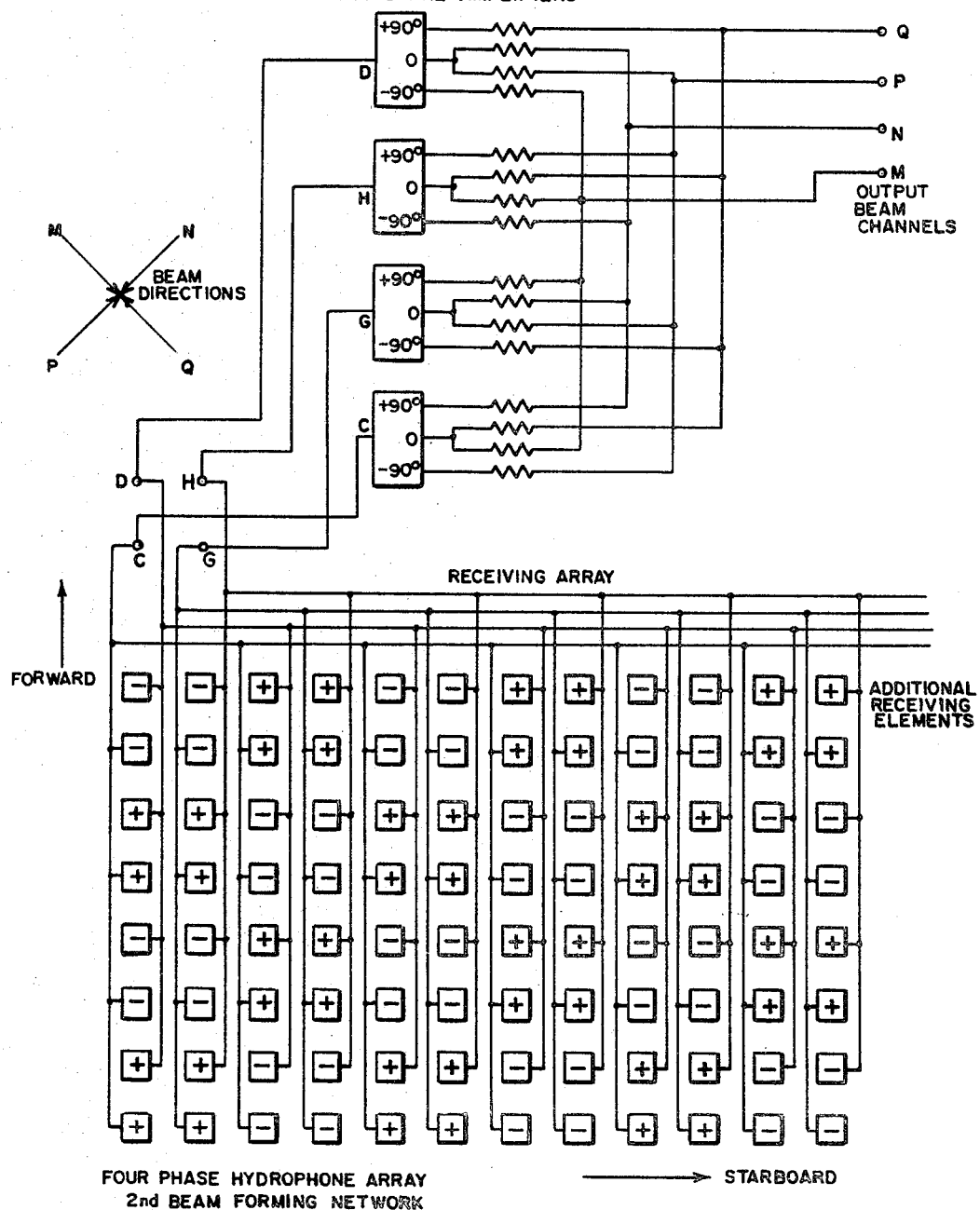

3,436,721
FAN BEAM ACOUSTIC DOPPLER
NAVIGATION SYSTEM
Harold K. Farr, Westwood, Mass., assignor to General Instrument Corporation, Newark, N.J., a corporation of New Jersey
Filed Jan. 16, 1968, Ser. No. 701,811
Int. Cl. G01s 9/66
U.S. Cl. 340—3           22 Claims

ABSTRACT OF THE DISCLOSURE

This is a Doppler type velocity measuring system for use by vessels sailing in deep water. The system comprises a transducer array for projecting a fan beam which is directed at a forward angle, and a receiving transducer array for receiving on a fan beam transverse to that of the transmitted beam and which intersects the latter on the ocean bottom. A receiver utilizes the Doppler difference in frequency to determine the velocity of the vessel. In preferred form there are four fan beam intersections, one pointing forward starboard, another pointing forward port, and another pointing aft starboard, and the fourth pointing aft port. The four received beams then may be used for measurement of both tracking or forward velocity, and drift velocity. In deep water the reverberation may exceed the desired signal reflected from the bottom. To overcome this I employ gating. I combine the advantage of pulses with the advantage of continuous transmission by using keying means to change the transmitted frequency cyclically. The receiver selects and separates the received frequencies, and gates them to minimize the effect of reverberation. There is only a single transmitting array and a single receiver array, together with beam steering means utilizing phase difference to steer the transmitting beam forward and aft, and to steer the receiving beams toward port and starboard, thus providing the desired four fan beam intersections, while using only two transducer arrays. The cabling of the transducers in each array is greatly simplified by appropriate selection of the phase difference being used.

Background of the invention

Figure 1:
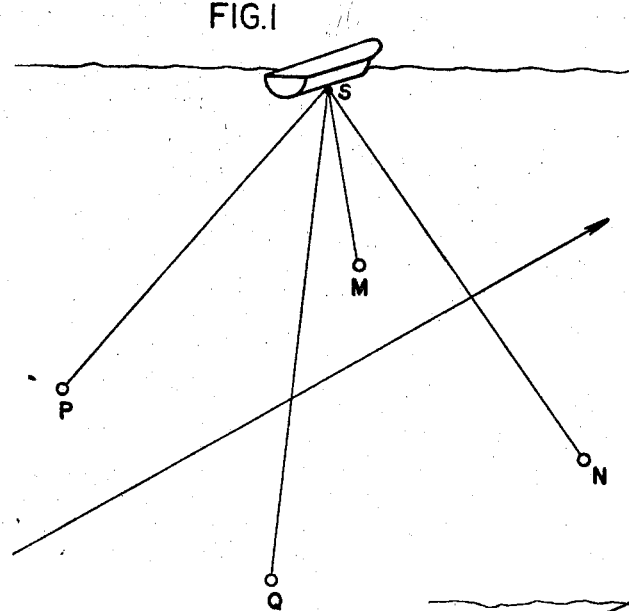

The basic principles of Doppler navigation are known. For ship's navigation, one or more narrow sound beams are directed at the ocean bottom along directions making a considerable angle to the vertical. The frequencies of the back scattered signals received on the various beams are measured and compared with the transmitting frequency or with each other. The observed frequency shift gives a measure of the component of ship's motion along each beam direction. By proper choice of sound beams, the components of motion can be determined in both horizontal directions.

For a ship on the high seas, the ocean bottom is the nearest and most stable point of position reference. The Doppler acoustic method permits navigation with respect to the bottom without previous surveys.

Even with satellite navigation as a positioning system, Doppler navigation can perform two essential functions. One is to provide continuous positioning between fixes. The other is to provide an accurate velocity measurement at the time the fix is taken, as one of the data needed to reduce the satellite reading to an accurate position fix. An acoustic Doppler system provides accurate self-contained navigation means particularly useful for submarines. For vessels on the surface, the system is immune to electromagnetic jamming or atmospheric conditions.

Acoustic Doppler navigation devices have operated successfully in shallow coastal waters where it is easy to detect acoustic signals back scattered from the bottom. In water deeper than a few hundred fathoms, however, the practical problems of producing narrow beams and of combating attenuation and reverberation have so far discouraged or defeated attempts to obtain Doppler measurements with energy back scattered from the ocean bottom. Doppler systems operating in deep water have usually relied on signals scattered by particles in the water near the ship. Such a system measures the motion of the ship with respect to the water rather than the bottom, and therefore is subject to errors due to surface currents.

To reach the bottom in deep water requires the use of relatively low frequencies of the order of 12 kHz. or less. At higher frequencies the losses are so high as to require inordinately high transmitting power levels. In addition, accurate Doppler navigation requires relatively narrow sound beams, in great contrast with conventional bottom sounding sonar, and to generate such sound beams at low frequencies requires large transducers with dimensions of the order of several feet. This in turn introduces problems of stabilizing the beam direction against roll, pitch and yaw. The problem is further aggravated by the requirement for steering the beams out at large angles to the vertical. The energy back scattered from the bottom at these angles is often only a small fraction of that obtained from a vertical beam as used in conventional echo sounders.

A further problem in deep water is volume reverberation. The signal from the bottom may be much weaker than that caused by scattering from particles in the water. In echo sounding, this problem is solved by using short pulses, and if necessary gating out returns from the deep scattering layer where volume reverberation is particularly severe. This is not easily done in a Doppler system, since accurate navigation requires very precise measurement of the frequency of the return signal, and this can only be done with long pulses or more preferably with continuous reception.

Summary of the invention

The present invention is a Doppler type velocity measuring system for use by vessels sailing in deep water. The system comprises transducer means for projecting a fan beam which is directed at an angle to the vertical, and a receiving transducer or hydrophone means for receiving a fan beam which fans in a direction transverse to that of the transmitted beam and which crosses the latter. There is receiver means responsive to a difference in frequency between the transmitted fan beam and the received fan beam scattered or reflected from the bottom. The receiver utilizes this difference in frequency to determine the velocity of the vessel. An array of transmitting transducers is disposed fore and aft or in keel direction to produce a fan beam which fans athwartship. Another array of hydrophones disposed with the long axis of the array athwartship provides a receiving fan beam which is disposed in fore and aft or keel direction.

More preferably there are two fan beam intersections with one of said intersections pointing forward of the vertical and the other of said intersections pointing aft of the vertical, and with the receiver being responsive to frequency difference in fore and aft direction, that is, to the sum of the Doppler shifts in the two directions. For determination of drift there may be two fan beam intersections, one pointing away from the vertical in starboard direction, and the other pointing away from the vertical in port direction. In preferred form the system employs four fan beam intersections, one pointing forward starboard, another pointing forward port, and another pointing aft starboard, and the fourth pointing aft port. The four received beams then may be used for measurement of both tracking or forward velocity, and drift velocity.

Unlike sounding or sonar systems using short pulses, it is preferable in a Doppler system to employ long pulses, and even better, continuous transmission. However, in deep water the reverberation may exceed the desired signal reflected from the bottom. To overcome this I employ gating which, in turn, requires pulses. I combine the advantage of pulses with the advantage of continuous transmission by using keying means to change the transmitted frequency cyclically. The receiver selects and separates the received frequencies, and gates them to minimize the effect of reverberation. In subsequent intermediate amplifiers the different frequencies may be converted to a common frequency for use in the counters of the receiver.

Multiple arrays of transducers might be used for the multiple beams, but in preferred form, there is only a single transmitting array and a single receiver array, together with beam steering means utilizing phase difference to steer the transmitting beam forward and aft, and to steer the receiving beams toward port and starboard, thus providing the desired four fan beam intersections, while using only two transducer arrays. The cabling of the transducers in each array is greatly simplified by appropriate selection of the phase difference being used. Means are also provided for splitting the port and starboard receiving fan beams into fore and aft lobes so as to provide separate receiving channels for each of the four intersections of receiving and transmitting beams.

Figure 2:
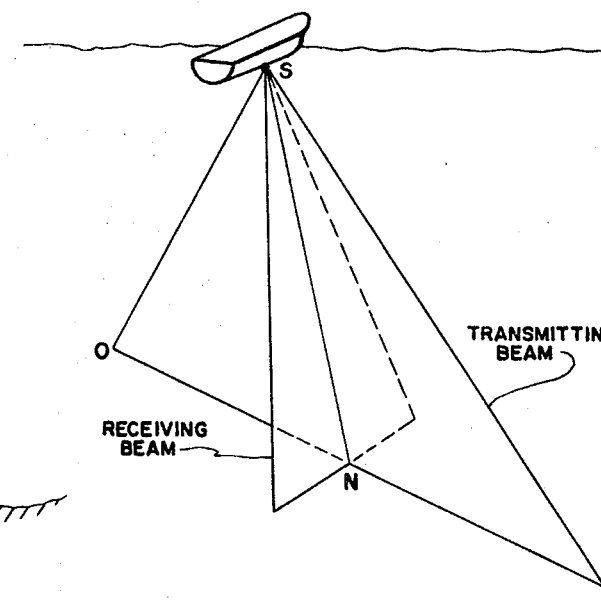
Figure 3:
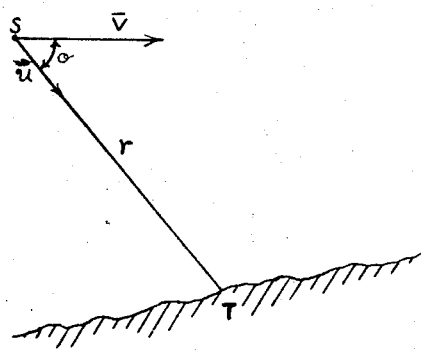
Figure 4:
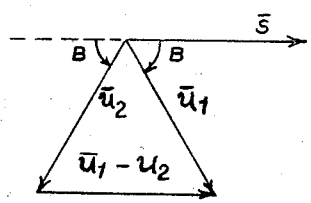
Figure 5:
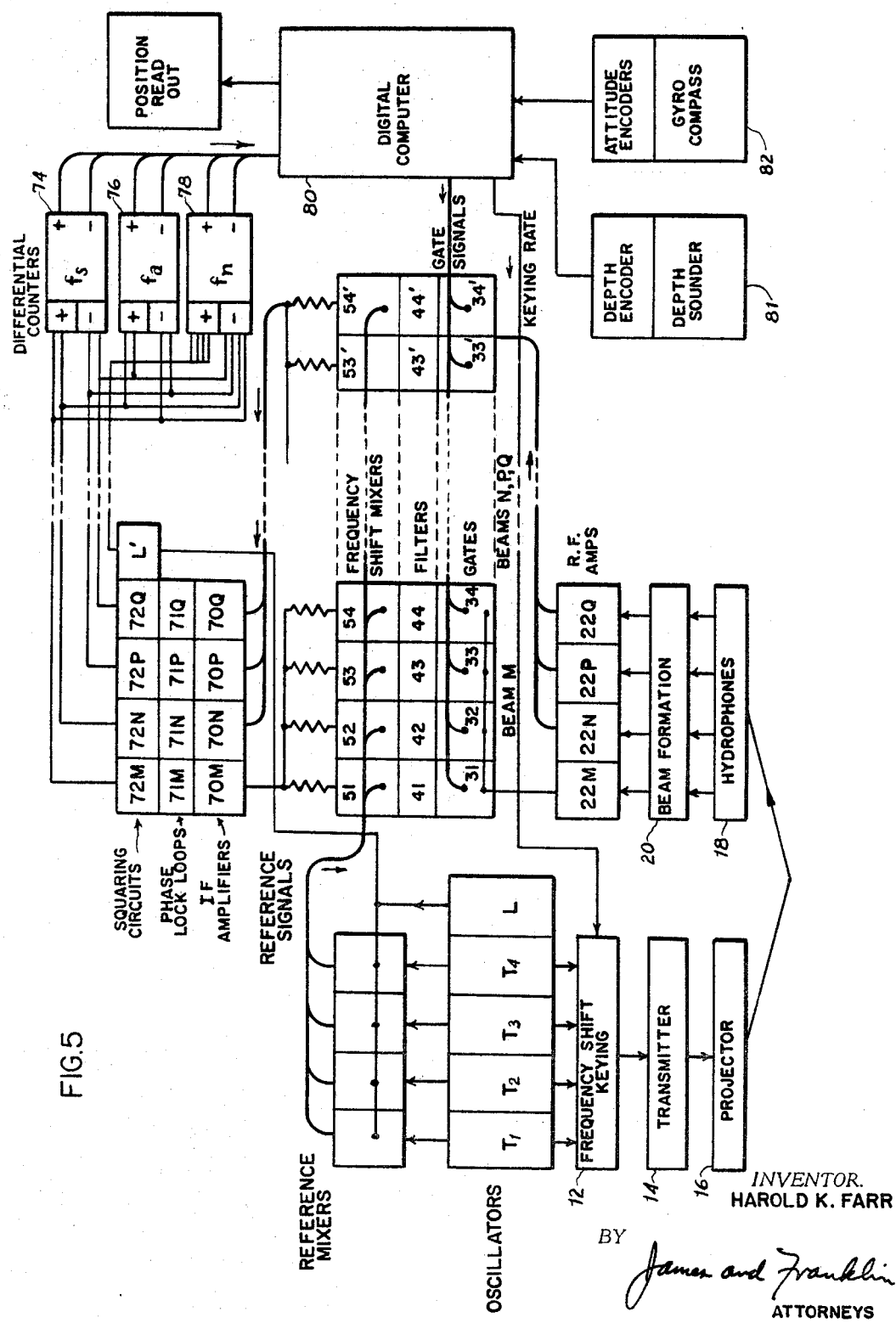
Figure 15:
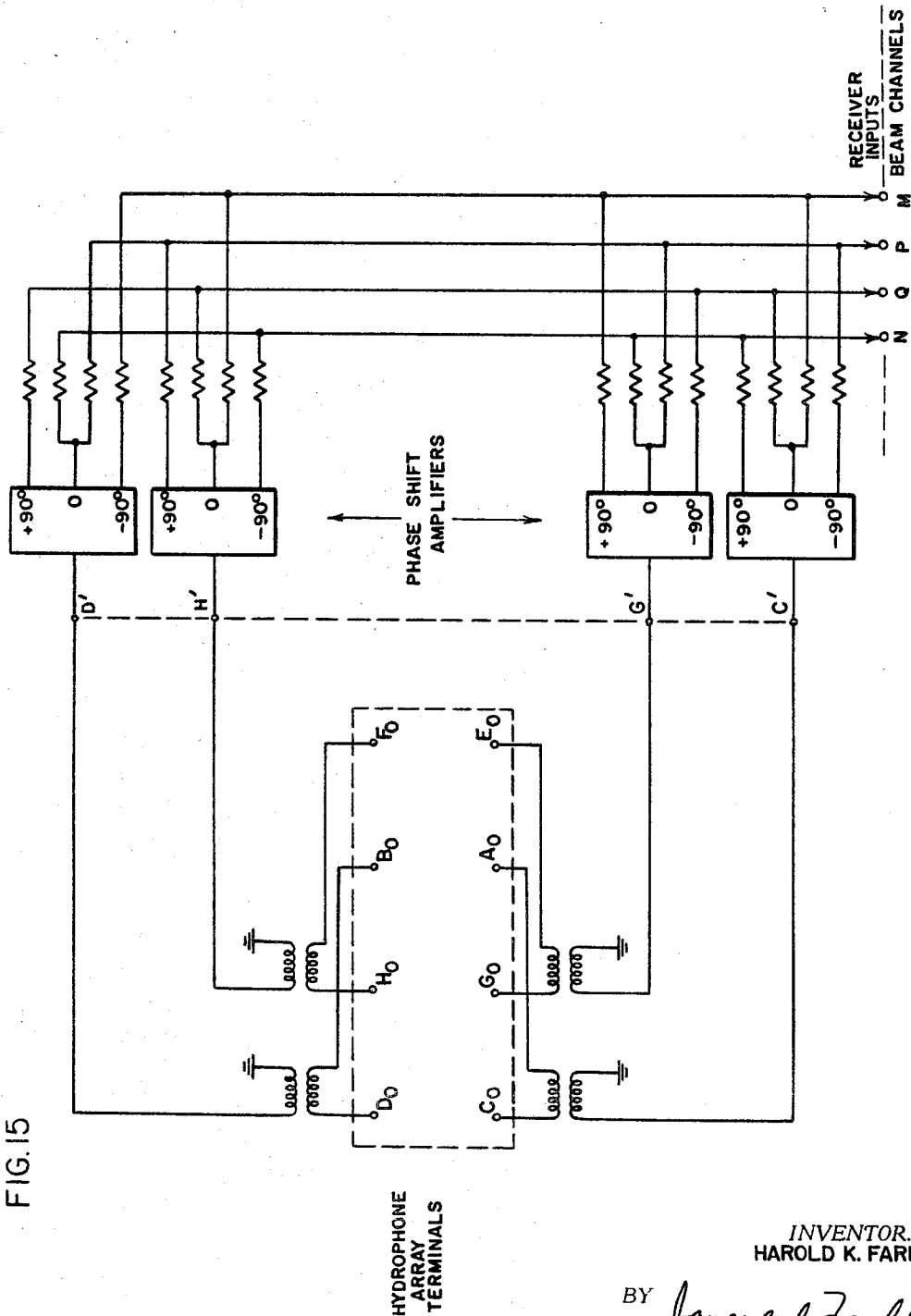
Figure 16:
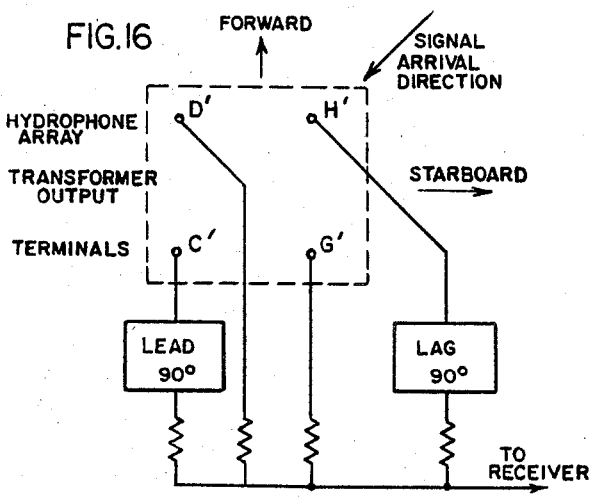
Figure 19:
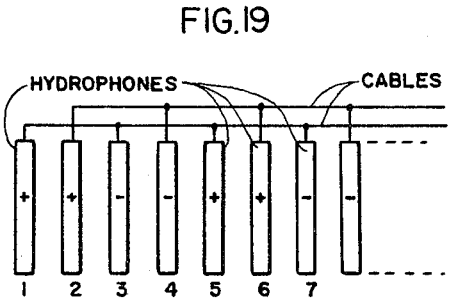
Figure 17:
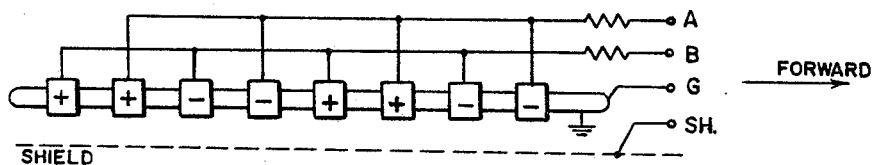
Figure 18:
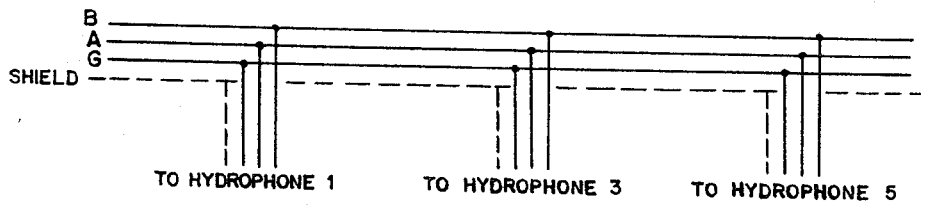
Figure 20:
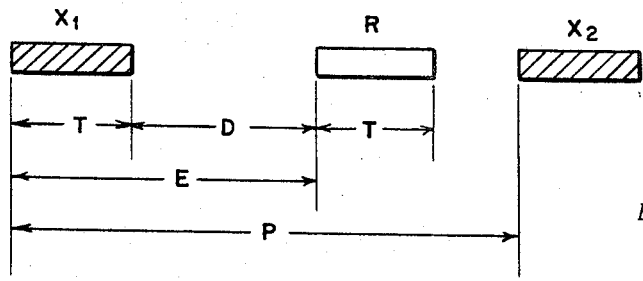
Figure 21:
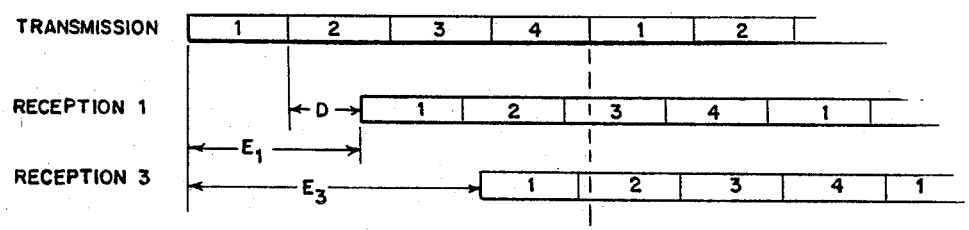
Figure 22:
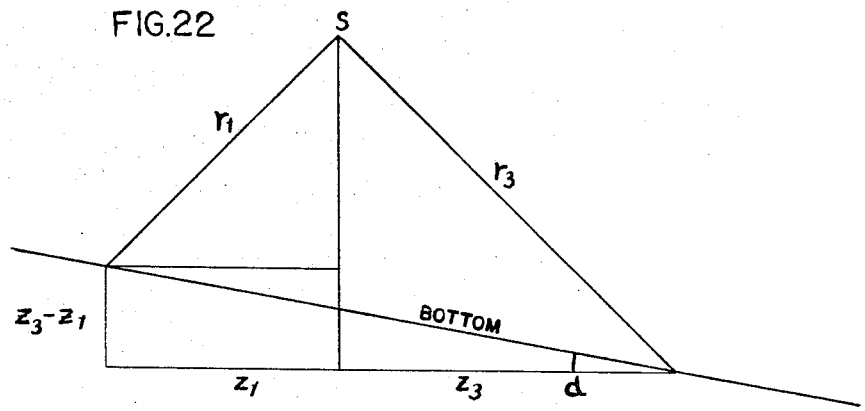
Figure 23:
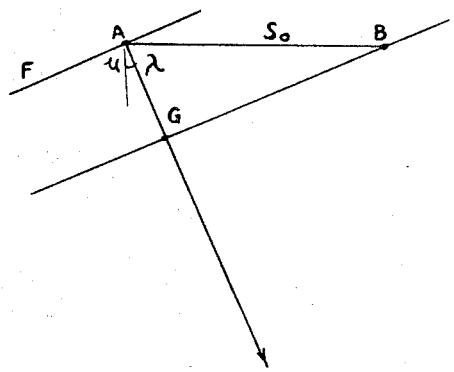
Figure 24:
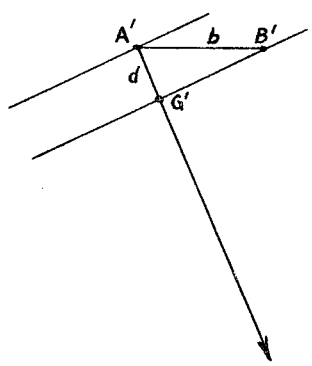
Figure 25:
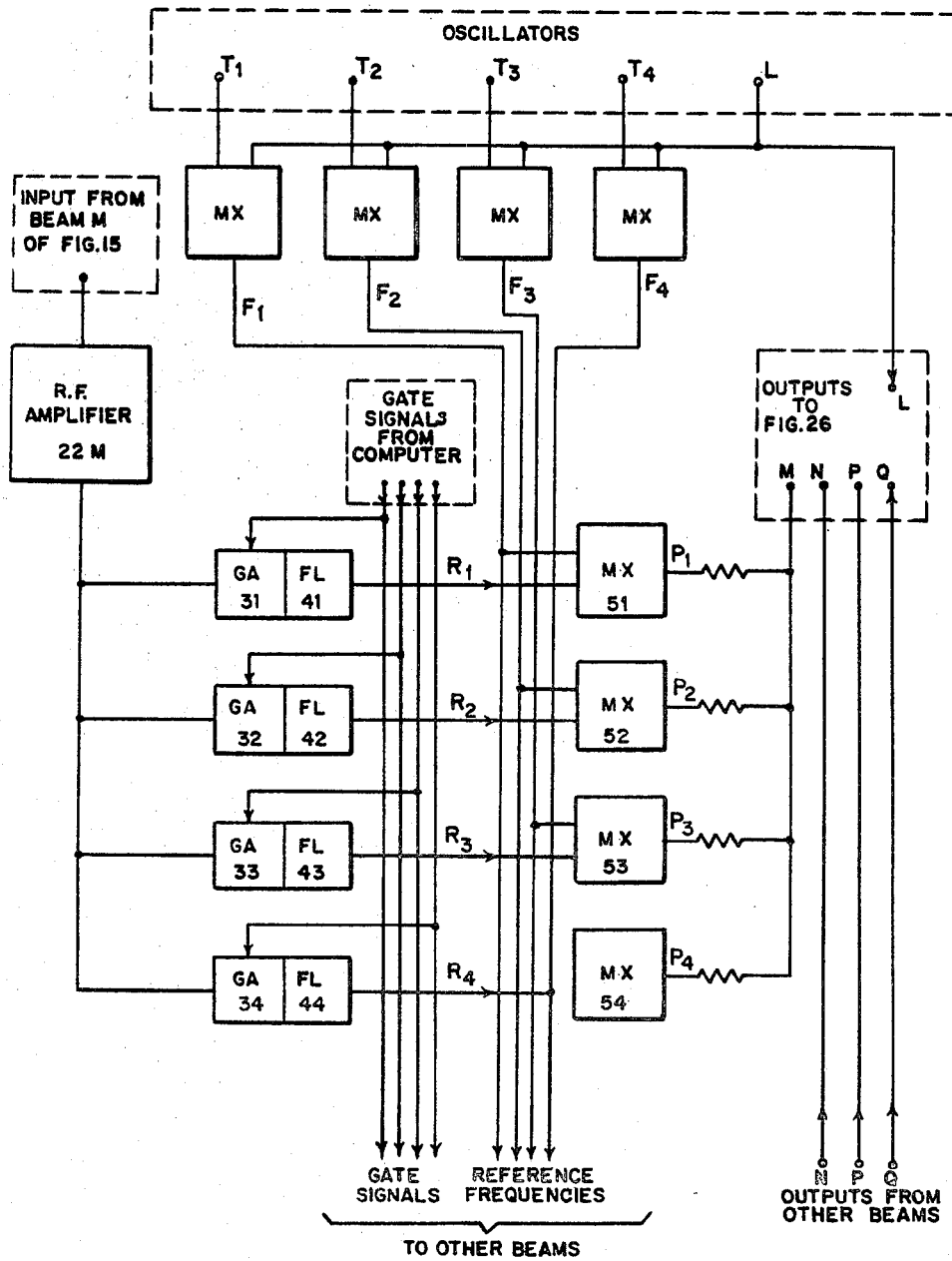

The foregoing and additional featuers are described in the following detailed specification, which is accompanied by drawings in which:

FIG. 1 shows the preferred use of four acoustic beams;
FIG. 2 shows how each of the four beams is obtained by the intersection of two fan beams;
FIG. 3 is explanatory of a Doppler system using one sloping fan beam intersection;
FIG. 4 is explanatory of the use of two oppositely sloping fan beam intersections;
FIG. 5 schematically shows my apparatus for use with four fan beam intersections;
FIG. 6 is a plan view showing the pattern of the four fan beam intersections on a flat ocean bottom;
FIG. 7 is explanatory of the operation of the projector;
FIG. 8 is explanatory of the operation of the receiver;
FIG. 9 shows the radiation pattern of the transmitter beams;
FIG. 10 is a schematic plan view of the hydrophone or receiver array;
FIG. 11 is explanatory of cable connection to one transducer of an array of transducers acting as the hydrophone;
FIG. 12 is explanatory of beam steering;
FIG. 13 is explanatory of an array of hydrophones for four Doppler beams;
FIG. 14 is explanatory of a system adding echo depth sounding to the Doppler velocity measuring system;
FIG. 15 corresponds to box 20 in FIG. 5, and shows how the array output is treated to obtain four output beam channels;
FIG. 16 is explanatory of a phasing circuit for one of the four beams;
FIG. 17 shows the hydrophone connections with a special polarization of the transducers;
FIG. 18 is explanatory of the cable connection to the hydrophone units;
FIG. 19 also shows cable connections to the hydrophones;
FIG. 20 is explanatory of the selection of keying pulse length;
FIG. 21 shows the pulse relation when using four frequencies;
FIG. 22 shows diagonally opposite beams disposed at 45° angle to the vertical;
FIG. 23 is explanatory of the Doppler system on a ship moving from point A to point B;
FIG. 24 is explanatory of the beam-forming geometry with transducers spaced by a distance $b$;
FIG. 25 corresponds to a part of FIG. 5, and shows apparatus for processing one received beam channel;
FIG. 26 corresponds to a part of FIG. 5, and is explanatory of the treatment of four fan beam outputs; and
FIG. 27 shows the use of hydrophones of two oppositely polarized types.

FIG. 1 shows a pattern of four acoustic beams SM, SN, SP, and SQ for a Doppler navigation system. These four beams intersect the ocean bottom at points M, N, P and Q with M and N forward of the vessel S, and P and Q aft. Fewer than four beams may be used, but the present arrangement with four beams has practical advantages. The frequency difference $f_N - f_Q$ between N and Q, will permit determination of the forward component of the ship's speed. Likewise, the frequency difference $f_M - f_N$ gives the across track component or drift. The accuracy of forward velocity measurement is increased by using the combined frequency difference $f_M + f_N - f_P - f_Q$ instead of using either $f_M - f_P$ or $f_N - f_Q$ alone.

The most obvious method of obtaining the pattern of FIG. 1 is to transmit four pencil or search light beams with axes along the chosen directions. The energy in each beam is then confined to a narrow pencil none of whose rays diverge from the prescribed axis by more than a very small angle. Four receiving beams could be generated by the same or a similar transducer, so that the four receivers are sensitive only to energy from the bottom target poins M, N, P and Q. This beam arrangement is quite suitable for use at high frequencies and short ranges where the transducers may be small, and where mechanical stabilization is easily implemented.

In a deep water Doppler system, however, generation of a pencil beam requires an inordinately large transducer. A pencil beam two degrees wide at 11 kHz. would require a circular transducer about 13 feet in diameter. Since at least three beams are desirable in a practical Doppler system there must be at least three such large transducers for the projector, and unless pulse length is sacrificed to permit transmission and reception on the same transducer, another set of three large transducers is required for reception. At long ranges, the stabilization problem also is much more critical. If the ship rolls 5° in a five second interval, this will have little effect on a signal reflected from 100 fathoms where the round trip travel time is only 0.25 second. However, at 2000 fathoms where the time interval is 5 seconds, the receiving beam would not be pointed at the insonified bottom area unless it is carefully stabilized. The requirement for very large transducers and precise stabilization renders the pencil beam concept impractical in deep water.

These problems are solved here by the use of crossed fan beams as illustrated in FIG. 2. This figure illustrates the technique for getting a signal from one point, which may be one only of the four target points such as the point N in FIG. 1. The transmitter insonifies a long narrow strip OR by means of a fan beam SOR. A receiving fan beam intersects this at right angles to define the target point N. The transducer required to generate or receive a fan beam is a long narrow array of small transducers having only a fraction of the total active area required for a pencil beam. Typically, the projector might be five inches wide and fourteen feet long for a two degree (meaning thickness or width) fan beam at 11 kHz. The receiving array may be the same in length but, as explained later, the width is increased to some twenty inches to provide better discrimination between the fore and aft beams. These transducer arrays are placed on the bottom of the ship, and the draft is not increased appreciably. In principle, they could be placed flush with the hull but it is usually more practical to mount them externally. The projector array is preferably mounted with its long axis parallel to the keel, and the receiving hydrophone array preferably has its long axis athwartship but these two positions can be interchanged. The athwartship array can be bent in the athwartship vertical plane to conform to the hull. Eight such arrays could be used, two each for the four points M, N, P and Q of FIG. 1. Six may be used, two for projection, four for receiving. Preferably a single projector array and a single receiving array can be used to process signals from all four bottom target points, because the fan beams can be "steered" over a wide range of angles by electronic means, while the transducers are rigidly attached to the hull.

There are two aspects to the stabilization problem. One is the need to insure that the receiving beam sees the bottom area insonified by the projector. The other is the effect of ship's motion on the Doppler frequency. As to the first problem, the crossed fan beams eliminate need for stabilization because the receiving and transmitting beams always intersect even though there has been some roll or yaw between transmission and reception. The second problem is handled more simply by operating on the measured Doppler frequencies with the beams fixed relative to the ship, rather than attempting to steer the beams so that their directions remain fixed with respect to the earth.

The crossed fan beam technique therefore has several important advantages for a deep water Doppler navigator. It greatly reduces the size and complexity of the transducers required. It eliminates the need for stabilization against roll, pitch and yaw. The transducers conform to the hull of the ship. A further important advantage explained in more detail later is that the linear phased arrays used to form the fan beams have the property that for moderate bandwidths the observed Doppler shift is independent of the transmitting frequency and the sound velocity, except for some secondary corrections associated with changes in ship's attitude. This is in contrast with conventional systems in which the sound velocity is critical and must be carefully monitored, and any change in transmitting frequency produces the same percentage change in the Doppler frequency.

Crossed fan beams have already been used for a very different purpose, namely contour mapping of the bottom, disclosed in U.S. Patent 3,144,631, issued Aug. 11, 1964 and entitled "Radiation Mapping System," and in U.S. Patent 3,296,579, issued Jan. 3, 1967 and entitled "Contour Map Generator." However, they have not been used in the manner here shown nor in a Doppler system for velocity measurement.

Referring now to FIG. 3, a ship S is moving with a velocity V and transmitting a signal at frequency $f_0$ which is scattered from a point T at the bottom, and returns along a path $r$ to a receiver at S which measures a frequency $f_r$. The difference $$f = f_r - f_0 \qquad (1)$$

is the Doppler frequency shift.

The round trip phase shift of the signal is $$2(2\pi r/\lambda) \qquad (2)$$

where $\lambda$ is the wavelength. The angular Doppler frequency $\omega = 2\pi f$ is equal to the time rate of change of the phase shift so that $$f = 2(dr/dt)/\lambda \qquad (3)$$

But the range rate is $$dr/dt = V \cos \sigma \qquad (4)$$

so that $$f = 2(V/\lambda) \cos \sigma \qquad (5)$$

where $\sigma$ is the angle between the ship's path and the direction of the signal.

In the vector notation, this can be written $$f = 2(\overline{V} \cdot \overline{u})/\lambda \qquad (6)$$

where $\overline{V}$ is the ship's velocity vector and $\overline{u}$ is the unit vector along the beam axis. The Doppler shift $f$ therefore is a measure of the component of ship's velocity along the beam direction.

Referring now to FIG. 4, suppose there are two beams along directions $\overline{u}_1$ and $\overline{u}_2$. The difference in frequency on the two beams is evidently $$f_d = 2\overline{V} \cdot (\overline{u}_1 - \overline{u}_2)/\lambda \qquad (7)$$

If the two beams lie in the same plane with one of the ship's axes $\overline{s}$, and if they make a common angle B with opposite directions of the axis, then $\overline{u}_1 - \overline{u}_2$ is along the axis $\overline{s}$. In fact, if $\overline{s}$ is a unit vector then $\overline{u}_1 - \overline{u}_2$ equals $2\overline{s} \cos B$ and we have $$f_d = 4(\overline{V} \cdot \overline{s})(\cos B)/\lambda \qquad (8)$$

where B is a constant angle which is independent of ships's attitude. Here $\overline{V} \cdot \overline{s}$ is the component of velocity along the ship's axis. Comparison with Equation 6 shows that a single beam (as in FIG. 3) measures the component of velocity along the beam axis, whereas a pair of beams (as in FIG. 4) gives directly the velocity component along a chosen ship's axis (but multiplied by 2 cos B).

It should be noted that the two beams used to measure the velocity component along the ship (measuring in keel direction) may make any convenient common angle athwartship. The only requirement is that both beams make the same angle B with the long axis of the ship, one of the angles being measured forward, and the other aft, and that the two beams lie in a common plane with the axis.

In a similar way, two beams making equal and opposite angles with the port and starboard directions of the athwartship axis will give a frequency proportional to the component of ship's velocity in the athwartship or drift direction.

As described previously, the frequency difference from either pair of beams M and P, or N and Q in FIG. 1 can be used to give the velocity component keelwise. These are preferably combined to give the frequency $$f_s = f_M - f_P + f_N - f_Q \qquad (9)$$

for the along ship velocity component in the forward direction (but multiplied by four). Likewise $$f_a = f_N + f_Q - f_M - f_P \qquad (10)$$

is used for the athwartship component in the starboard direction (again multiplied by four). Here $f_M$, $f_N$, $f_P$ and $f_Q$ represent frequencies received on the four beams in FIG. 1. It will be seen from that figure that the vector $\overline{u}_1 + \overline{u}_2 + \overline{u}_3 + \overline{u}_4$ representing the sum of the directions of the four beams is along the direction perpendicular to the ship's deck plane. Hence the frequency $$f_n = -(f_M + f_N + f_P + f_Q) \qquad (11)$$

measures the component of velocity in up and down direction, that is, normal to the plane of the deck. This component is of value because it allows for trim and/or list of the vessel, and it also may be of value in submersibles.

In Equation 5 the factor of 2 appears because of the round trip, with a frequency shift in each direction. For two beams the frequency difference $f_d$ given by Equation 8 could also be written $$f_d = 4(V/\lambda)(\cos E)(\cos B)$$

where E is the angle between the velocity V and the appropriate ship's axis chosen so that it lies in a common plane with the two beams and makes a common angle B with both beams, as in FIG. 4 where the axis is denoted by $\bar{s}$.

For four beams, if we develop the frequency, $$f_s = f_M + f_N - f_P - f_Q$$

as in Equation 9 then it is related to V by $$f_s = 8(V/\lambda)(\cos E) \cos B$$

since it is essentially the sum of two frequencies like $f_d$.

FIG. 5 shows the essential components of my deep water Doppler navigator system. In order to have continuous reception without interference from volume reverberation, the transmitter uses frequency shift keying. I show the use of four frequencies, but a lesser or greater number may be used. All of the frequencies are used on each beam, and it is merely a coincidence that I happen to show four frequencies and four beams. The received signal corresponding to each transmitted frequency is isolated and gated to provide reception only during the interval when volume reverberation is low.

Signal flow starts with the four oscillators $T_1$, $T_2$, $T_3$ and $T_4$. These are keyed so that transmission is cycled through each frequency in turn. The keying rate is determined by a computer 80 on the basis of depth or slant range information. As shown in FIG. 5, this information can be supplied to the computer 80 from an auxiliary depth sounder 81. If the Doppler navigator system is part of or combined with a bottom mapping system, the necessary information can be obtained from that source. A third alternative is to determine the slant ranges by observing the time of arrival of the leading edge of each frequency component in the Doppler receivers.

The output of the frequency keyer 12 is a continuous AC signal of variable frequency. This is amplified by the transmitter 14 and applied to the projector transducer array 16 which generates the transmitted sound beam as described later.

The return signal is received by a hydrophone array 18 described later. The signals from the array 18 are processed by phasing or beam forming amplifiers 20 having four output channels representing the individual signals on beams M, N, P and Q.

The four outputs of the beam forming circuits in box 20 are processed by Doppler receivers. The signals are first amplified in four R-F amplifiers 22M–22Q, one for each beam. The output of each of the four R-F amplifiers is applied to the inputs of four (or three or five, etc., as the case may be) channels for processing the different transmitted frequencies, making in this case 16 channels in all. Only the processing for beam M is shown in detail in the middle of FIG. 5. The first stage in each of these channels is a gate 31 (or 32 or 33 or 34) which is turned off when the corresponding frequency is being transmitted and for a period thereafter, to allow decay of volume reverberation, after which it is turned on to allow reception. The gates 31–34 are followed by filters 41–44 to isolate the four frequency bands, and mixers 51–54 to shift the received frequency to a common I-F band, so that all four channels can be combined to permit continuous reception. All frequencies are offset by a common value L so as to preserve the algebraic sign of the Doppler shift. The mixer 51 in frequency channel number one mixes the received signal with a reference signal formed by beating the local oscillator L with the transmitting frequency $T_1$. The reference signal for mixer number two is derived from local oscillator L and transmitting frequency $T_2$, and so on. The horizontal broken lines at the middle of FIG. 5 represent the omitted ten additional gates, filters, and frequency shift mixers.

After combining the outputs from the four frequency channels on each beam, the signals from the four beams are processed by I-F amplifiers 70M–70Q respectively, and squared up in squaring circuits 72M–72Q, to form a train of standard pulses recurring at frequency $L+f$ where L is the local oscillator frequency common to all four beams, and $f$ is the Doppler frequency shift for that beam. These pulses are processed by differential counters 74, 76, 78 to provide the three desired output frequencies $f_s$, $f_a$ and $f_n$ in accordance with Equations 9 through 11 above. Each of the three counters has two sets of input terminals (shown on the left) designated + and −. The counter adds the input frequencies appearing at the positive inputs and subtracts those appearing at the negative input terminals. Likewise each counter has one positive and one negative output terminal (shown on the right as + and −). Output pulses from the $f_s$ counter 74 for example appear at a rate $|f_s|$ on the positive or negative terminal according as $f_s$ is positive or negative (for velocity forward or aft).

The equation used by the computer 80 to determine distance traveled in, for example, the easterly direction from the time $t=0$ when an initial fix was taken to the present time $t=T$, is $$E = \int_0^T A f_a dt + \int_0^T S f_s dt + \int_0^T N f_n dt \quad (12)$$

where each of the coefficients A, S and N depend on all three attitude variables roll, pitch and heading. They also include a proportionality factor which depends on system parameters such as the spacing of the elements in the array.

Each time the computer senses a pulse on the positive line of the $f_a$ channel it adds the current value of A to the current E. If a pulse appears in the negative $f_a$ channel it subtracts A from E. In the same way, an amount S or N is added or subtracted from E when pulses appear on the $f_s$ and $f_n$ channels.

A similar equation, with different coefficients A', S', and N' is used to compute D, the distance traveled in the north direction. When initial values of D and E are known, these are set into the computer manually or otherwise. From then on, the Doppler data update D and E continuously as just described and the current values are read out as present position on a typewriter or printer or on a digital display unit.

The foregoing is a general description of the apparatus. Its parts are described later in detail.

Since it will be desirable to measure speed to at least 0.1 knot and preferably better, the frequency should be measured with an accuracy of the order of one tenth of one cycle per second. If a pulsed system were used this would require pulse lengths of several seconds, which would exceed the travel time at moderate depths. The proposed equipment therefore preferably operates with continuous transmission.

Most of the problems in a Doppler navigator stem from the dependence on the beam angle. Since the angular error increases with beam width, it is important to make the beams as narrow as possible and to aim them out at wide angles from the vertical. It is preferable not to steer the beams outward more than about 45° to the vertical, since the slant range begins to increase rapidly at larger angles, and the back scattering power of the bottom drops off rapidly at small grazing angles. The twin beam technique has the advantage that output accuracy is much less dependent on the attitude parameters, roll, and pitch as supplied by the gyro compass.

The fan shaped beams are generated by long narrow arrays of transducer elements, one array for transmission, and one array at right angles for reception. For a large flat-bottom ship, both arrays are located on the bottom of the ship in a plane generally parallel to the deck plane. On small ships, the hydrophone or receiving array whose long axis is athwartship, may be bent up out of this plane to conform to the hull profile.

The beam direction is controlled by electrical phasing of the transducer elements. When this is done, each ray in the fan makes the same angle with the axis of the straight array. The fan is therefore curved like the surface of a cone with its axis along the array axis and its apex at the transducer. When such a beam intersects a flat ocean bottom, the intersecting curve is a hyperbola. FIG. 6 shows the pattern of the proposed beam system intersecting a flat ocean bottom when the ship is level and directly over the point O. With a transmitting array parallel to OY one fan is steered forward about 30° to intersect or insonify the bottom along a line $T_1T_2$, and a second transmitting fan is steered aft to insonify the bottom along a line $T_3T_4$. With the receiving array parallel to OX we can likewise generate receiving beams with intersections along curved lines $R_1R_2'$ and $R_3R_4'$. The effective pointing accuracy is determined by the thickness of the fans.

All these beams are formed simultaneously using only the two transducer arrays, one for transmission and one for reception. The four receiving beams respond only to energy scattered or reflected from the four points A, B, C and D of the bottom. The simultaneous receiving beams are formed by a technique described later. The dual transmitting beam technique is next described.

In a typical application of "electronic beam steering" a transducer array comprises a set of identical transducer elements arranged in a line with a uniform center-to-center spacing $b$. The transmitted (or received) sound energy occupies a narrow frequency band with a wavelength $\lambda$ in water. A distinct phase shift is introduced in the electrical circuit connected to each element, such that the phase increases by a constant value $\phi$ from one element to the next. The phase of element number $n$ is then $n\phi$ or some constant plus $n\phi$. The angle B between the axis of the array and any ray in the conical fan beam is given by $$\cos B = \phi\lambda/2\pi b \quad (13)$$

The amount by which the fan beam is steered away from the plane perpendicular to the array axis is given by the steering angle $$\mu = 90° - B \quad (14)$$

which in turn is given by the equation $$\sin \mu = \phi\lambda/2\pi b \quad (15)$$

In conventional operation the element spacing $b$ is chosen to be small enough to satisfy the condition $$b < \lambda/(1+\sin \mu_x) \quad (16)$$

that is, less than some value between one half and one wavelength depending on the magnitude $\mu_x$ of the maximum steering angle $\mu$ to be used ($\mu_x \geq 0$). There would then be a single fan beam representing the direction of maximum transmission or reception of sound energy. In this system, however, there are generated simultaneously two transmitting fan beams steered at equal angles fore and aft. This is done by setting $\phi$ equal to $\pi$, and choosing the spacing $b$ a value larger than $\lambda/(1+\sin \mu_x)$. This then results in dual beams at angles $\pm\mu$ where according to Equation 15

$$\sin \mu = \lambda/2b \quad (17)$$

This choice of $\phi$ is particularly convenient as it can be obtained merely by connecting all transducer elements in parallel, but with reversed polarity on alternate elements.

As an example of parameter values, we can take:

transmitting frequency=$f_0$=10,7000 Hz.
sound velocity in water=C=4900 ft./sec.
wavelength=$\lambda$=5.5″
steering angle=$\mu$=28°
element spacing=$b$=5.85″ in agreement with Equation 17.

To picture the radiation pattern more clearly, it is necessary to define certain angles as in FIGS. 7 and 8. Here the vector $\bar{u}$ represents the direction of the sound ray of interest, either transmitted or received. (In the latter case, the sense of $\bar{u}$ is the reverse of the direction of propagation.) The angles A, B and C are those between $\bar{u}$ and the X, Y and Z axes with X athwartship along the axis of the receiving array, and Y along ship (keel direction) and along the axis of the transmitting array or projector. The angles $\theta$ and $\mu$, the complements of angles A and B, are the angles with by $\bar{u}$ with the YZ and XZ planes respectnvely. The values of $\theta$ and $\mu$ when $\bar{u}$ is in the direction of maximum response are the steering angles in the two directions.

FIG. 7 is for the projector. Here the fan beam comprises directions $\bar{u}$ lying in the surface of a cone with axis along Y, that is, directions of $\bar{u}$ for which B has some constant value 90°−$\mu_0$ where $\mu_0$ is the steering angle. It is therefore convenient to represent different rays within the fan by the "rotation angle" $\tau$ which is the angle between two planes through the Y axis, one containing $\bar{u}$ and the other the vertical direction $z$. In FIG. 8 for the receiver, all symbols have the same meaning as in FIG. 7, but it is drawn to illustrate the steering angle $\theta$ and the rotation angle $\eta$ (instead of $\mu$ and $\tau$) as might be used to describe a receiving fan beam which lies in the surface of a cone with axis along X.

It is found that for a ray which is steered out by the same angle $\theta = \mu = 28°$ in both directions, the rotation angles have the common value $\tau = \eta = 32.1°$ and the inclination to the vertical is $C = 41.6°$.

FIG. 9 shows the approximate form of the radiation patterns of the transmitting beams. The upper plot is the radiation intensity along either the trace $T_1T_2$ or $T_3T_4$ of FIG. 6, as a function of the rotation angle $\tau$ about the Y axis. The lower plot in FIG. 9 shows the intensity of the transmitted beam along either $R_1R_2'$ or $R_3R_4'$ as a function of $\eta$. The peaks are at the intersection of the fan beams.

The transmitting pattern consists of beams which are very narrow in the fore and aft direction to provide high accuracy in the measurement of the along track component of the ship's velocity. The transmitting beams are broad in the across track direction, first because a narrow transducer array is preferred for convenience and economy, and second, in order to accommodate roll and heading changes as next described.

When the ship rolls, it merely rotates about the axis of the projector, so the fan continues to intersect the bottom along the same but extended traces $T_fT_f'$ and $T_aT_a'$ shown in FIG. 6. However, a particular lobe such as $T_1T_2$ shown as a solid line is shifted along the trace $T_fT_f'$ to port or starboard, as suggested by the broken line extensions. If there is a change in roll angle between transmission and reception, this lobe will be displaced laterally with respect to the receiving response trace $R_2R_2'$, but they will still intersect.

Assume a design for roll angles up to ±15°. This means that the transmitting beam may rotate as much as 30° with respect to the receiving beam between transmission and reception. Hence the fan coverage must extend over the range 32.1°±30° or from 2.1° to 62.1° on each side, or essentially a fan width from −62.1° to +62.1°.

Along the $\eta$ direction I use a beam width of say two degrees measured at the half power (−3 db) level. A uniform array would then be about 25.5 wavelengths long or 11.7 ft. for $\lambda$=5.5″ as assumed here. Allowing an additional factor of secant 30° for beam steering gives an array 13.5 ft. long. As computed above the element spacing should be $a=b=5.85″$.

The transmitting beam pattern just described has two main lobes pointed fore and aft and is used for the Doppler navigation equipment. If it is also desired to use the same projector or transmitting array as part of a depth sounding or bottom mapping equipment, a second transmitting channel and switching means are provided so that at intervals a short pulse of high energy is applied to the array with all elements connected with the same polarity instead of alternating polarity on successive elements. This will produce a single fan beam lying in the vertical athwartship plane and insonifying the bottom along the line XOX in FIG. 6. The echo sounding beam forming circuit can be further refined so as to stabilize against pitch as described in Patent No. 3,144,631, issued Aug. 11, 1964, entitled "Radiation Mapping System."

As mentioned above, the transmitting fan beam width is designed to exceed 60° in the athwartship direction so as to accommodate roll and to reduce the required width of the transducers. In use on a vessel where roll is expected to be small, however, there may be an advantage in splitting the fan indicated by the trace $T_1T_2$ in FIG. 6 into two smaller lobes centered at M and N so as to concentrate the energy in the region of the receiving beams. Similarly, $T_3T_4$ can be split into two lobes centered at P and Q. This can be accomplished by adding elements to the array so as to extend it in the athwartship direction. In place of a single row extending parallel to the keel, there will then be two or more such rows. Adjacent elements in each row are then wired in opposite polarity and all elements connected to a common channel. This results in a two dimensional array of transducer elements spaced uniformly on a rectangular grid. The polarity of the electrical connections alternates along both axes of the grid so that the polarity scheme has a checkerboard pattern with the red squares of one polarity and the black squares of opposite polarity. When the elements are thus driven from a common source, the transmitting response pattern has four identical beams whose projection on the plane of the array are along the four diagonal directions. It will usually be preferable to keep the athwartship dimension of the array small compared with the fore and aft dimension for reasons of economy and to insure that the four beams are each fan shaped.

The purpose of the transmitting beam is to insonify certain areas of the bottom, and the two lobes of the transmitting beam may be and are driven from a common oscillator. The receiving system, however, must isolate the energy from each of the four bottom points, and direct it to four separate output circuits or beam channels. The technique of the receiving beam formation is therefore different from that of the transmitting beam. In particular, the center to center spacing of the hydrophone elements must be less than about two thirds of one wavelength in order to prevent the formation of multiple main lobes, whereas the element spacing in the projector array is made larger than this to form the two main lobes.

FIG. 10 is a plan view of the receiving or hydrophone array. Each hydrophone, indicated by a single line, is typically a cylinder of the order of one inch in diameter and twenty inches long ($L=20''$). The hydrophones point fore and aft, and are collateral. The array is much longer than shown in FIG. 10, and is athwartship. A single hydrophone may be made up of a number of sensitive receiving elements which typically are rings or short cylinders of electrostrictive ceramic material each with two electrodes on the inner and outer surfaces. (See FIG. 11 for one hydrophone.) A single ground or common lead is connected to one electrode of each element, for example to all inner electrodes. The remaining terminal of each element is connected into the beam forming circuit.

To simplify the description of the beam forming process it will be described first in terms of the formation of receiving beams pointing only vertically and fore and aft. This concept will then be extended to four Doppler beams pointing port and starboard as well as fore and aft and to additional beams for echo sounding. The beam forming circuit is based on Equation 15 above, that is, $$\sin \mu = \phi \lambda / 2\pi b \qquad (18)$$

where $\mu$ is the steering angle, $\phi$ is the phase shift from one element to the next, $\lambda$ is the wavelength, and $b$ is the spacing between elements or rings of each hydrophone. There is an important advantage in choosing $\phi$ to be an integral submultiple of 360° such as 90° or 120°, because then there are only three or four different phases, and all rings of the same phase can be connected together so as to minimize the number of terminals.

In general we would like to form three beams in the fore and aft direction, for Doppler navigation two forward and aft beams having substantially the same directions as the transmitting beams $T_1T_2$ and $T_3T_4$ in FIG. 6, plus an unsteered beam lying in the vertical athwartship plane and intersecting the bottom along the line OX in FIG. 6 for echo sounding. The beam widths of the receiving beams measured in the fore and aft directions will be greater than those of the transmitting beams in order to accommodate pitch and yaw and to permit the use of relatively short hydrophones. The three beams can be formed with a three phase hydrophone where $\phi=120°$, and there are three output terminals plus ground. However, as there are some advantages to a four phase system with $\phi=90°$ and four output terminals plus ground, this will be discussed first.

FIG. 11 is a sketch of a hydrophone. It is shown with eight ring elements but the actual number is not critical, and could be nine or ten, etc. Every fourth ring element is connected to the same terminal. As before, we take as typical parameters $\lambda=5.5''$, $\mu=28°$ but now $\phi=90°$ or $\pi/2$ radians, so that Equation 18 requires a center-to-center spacing $b$ of the rings of 2.93''. For a wave arriving from the forward direction, the signals at the output terminals A, B, C and D have the vector or phase relationship shown by the four arrows A, B, C and D in FIG. 11.

The receiving elements (FIG. 11) may be mechanically mounted in a common housing (not shown), and usually are considered to be one hydrophone, but this is not essential. The sensitive elements could be individually housed and then wired together. Moreover, the individual elements are not necessarily ring shaped. The described construction is commercially available, except that I have brought out additional leads, in contrast to a conventional hydrophone in which all elements are connected to common terminals.

FIG. 12 is drawn to illustrate the concept of four-phase beam forming as applied to fore and aft steering. In practice, the technique is modified somewhat because of the need to steer port and starboard as well. The amplifiers $A_1$ and $A_2$ are identical components, each of which has two output terminals with phase shifts differing by 90°. They can be designed so that the signal is given a leading phase shift of 45° at the upper output terminal, and a lag of 45° at the lower terminal each measured with respect to the input terminal D' or C'.

To form a central beam when that is wanted, the signals from all four terminals are combined directly without any phase shift. For the fore and aft beams, however, the signals differ by 90° from one element to the next. Since the phase shift from A to C is 180° these signals can be combined in a transformer, as shown, and the same applies to signals from B and D. This leaves only two output terminals C' and D'. For the forward beam, the signal on terminal D or D' lead the signal on C or C' by 90°. The beam forming circuit for this beam therefore introduces a lag in D' and a lead in C'. The aft beam is formed by the opposite operation. The result of FIGS. 11 and 12 is to provide three output channels for each hydrophone. The forward beam terminals from all hydrophones may be fed into further phasing circuits which split the forward beam into separate beams in the port and starboard directions, and similarly for the central and aft terminals.

It is simpler however, to combine the operation of fore and aft steering with that of port and starboard steering in a single network. The inputs to this network are the four N terminals consisting of four terminals from each of the N hydro phones. (For echo sounding the four terminals from each hydrophone are combined as already shown in FIG. 12 to give one output from each hydrophone, and these N termianls are connected to a separate beam-forming network which is used only for that purpose and need not be discussed here.)

To form the four Doppler beams, I will describe first a technique which can be used when the array is confined to a plane. I may then refer to the partial array of FIG. 13 which shows the four N terminals laid out in the same plan view as the N hydrophones in FIG. 10. The first hydrophone is represented by the four terminals comprising the first vertical column on the left labeled ABCD as in FIG. 11. The other hydrophones are identical but the terminals are designated differently. The four beam directions projected onto the horizontal plane make angles of 45° with the fore-aft and port-starboard directions. For a signal arriving along the direction midway between forward and starboard, the voltages appearing on the top row of terminals D, H, B, F, D, H . . . have phases 0°, 90°, 180°, 270°, 0°, 90°. . . . The phase progresses in the same way along the left-hand column ABCD. The same is true for every row and column.

For a wave arriving from the aft starboard direction, the behavior is the same except that the phase shift along each column is in the opposite direction. Regardless of which of the four directions is considered, however, the phase differs by 180° for any two terminals lying in the same row or column and separated by one other terminal. Hence if we start at one terminal, move along a row two terminals, and then along a column two terminals, the total phase shift will be 180 ±180° which is always zero. Of course, moving four terminals along a row returns to the same phase also. This allows us to divide up the entire terminal array into cells each of which contains eight terminals as shown by the rectangles in FIG. 13. Corresponding terminals in each cell have the same phase and are designated by the same letters in FIG. 13. All the A termianls can be connected together, as can all the B terminals, etc. The entire array output then reduces to only eight terminals.

If it is also desired to form beams for echo sounding, the connections must be made through isolating resistors. There are then two resistors from each terminal of the array, one to the echo sounder and one to the Doppler navigator system. This is illustrated in FIG. 14 which shows a part of the same terminal array as in FIG. 13 but includes only the first six hydrophones. (For simplicity, FIG. 14 shows echo sounder outputs from only three of the six hydrophones and connections to only two of the Doppler output terminals $D_0$ and $G_0$.) To reduce the number and length of connecting leads the eight resistors preferably are built integral with the hydrophone, so that each hydrophone has five signal leads in addition to ground and shields; that is, one lead to the echo sounder and four to the Doppler navigator. The four Doppler leads from each hydrophone are connected into a common cable with eight leads $A_0$, $B_0$ . . . $H_0$.

FIG. 15 corresponds to box 20 in FIG. 5 and shows how the signals from the eight terminals of the array can be treated to obtain four output beam channels. These outputs are labeled M, N, P, Q in accordance with FIG. 1. The signals on terminals C', G', H' and D' are in phase with those on $C_0$, $G_0$, $H_0$ and $D_0$ but include the contribution from the other four array terminals as well. The concept of the phasing circuits in FIG. 15 is illustrated in FIG. 16 for beam N, the forward starboard beam. It is seen that the wave arrives at terminals D' and G' at the same instant so that these can be combined directly. Since it arrives first at terminal H' and last at terminal C', a lag is introduced in the former and a lead in the latter. Of course, the phase shifts shown for the phase shift amplifiers in FIG. 15 are purely relative. They could be made 0, 90° and 180° in place of −90°, 0, +90° for example. However, all phase shift amplifiers are identical.

If the echo sounding function is not required, a further simplification is possible. In FIG. 11, the elements A and C can be wired together in opposite polarity within the hydrophone and similarly for B and D. The hydrophone then requires only two output terminals A and B, plus ground. Connection of two elements with opposite polarity can be done in either of two ways. The two rings can be fabricated and polarized in identical fashion, and connected with the inner terminal of one connected to the outer terminal of the other. Or they can be polarized in opposite sense and connected with both outer terminals to one lead and both inner terminals to the other. FIG. 17 shows the connection for such a hydrophone with the polarization of each element or ring indicated as + or −.

With this kind of hydrophone, we eliminate the upper two rows of terminals in FIG. 13. If all the hydrophones are identical then the terminals in the bottom two rows are grouped into cells precisely as shown in FIG. 13, and their outputs are processed as shown in FIG. 15. In principle, the isolating resistors of FIG. 14 can be omitted, but in practice, it is preferable to use them even when echo sounding is not required. They serve the added purpose of isolating a defective hydrophone so that a short circuit in one hydrophone will not knock out the entire array. However, only one resistor is required for each lead.

The transformers shown in FIG. 15 can be omitted if one uses hydrophones of two types, one like that of FIG. 17, which is ++−−++−−, and a second identical but polarized in opposite sense, that is −−++−−++, from left to right. The collateral hydrophones are then mounted consecutively in pairs, two of type one, then two of type two, then two of type one, etc., so that the terminals $C_0$, $D_0$, $G_0$ and $H_0$ in FIG. 15 receive outputs of two hydrophones of one type, while terminals $A_0$, $B_0$, $E_0$ and $F_0$ receive outputs of two hydrophones of the other type. I then connect terminals $A_0$ and $C_0$ together directly, instead of through a transformer as shown in FIG. 15, and likewise for the pairs $G_0$ and $E_0$, etc. This leaves only four terminals $C_0$, $G_0$, $D_0$ and $H_0$ which are treated like C', G', D' and H' in FIG. 15.

This is illustrated in FIG. 27 which shows the wiring to the individual receiving elements. Each vertical group of eight elements corresponds to one hydrophone as previously discussed in connection with FIG. 11 and FIG. 17. These point fore and aft, but the array is disposed athwartship, and only part of the array in side to side direction is shown in FIG. 27. The four output terminals of the array are marked D, H, G, C, and these correspond to the terminals D', H', G' and C'; referred to above for FIG. 15. Their outputs are processed to provide the four beam channels M, N, P and Q, with beam directions as indicated by the arrows at the upper left corner of FIG. 27 of the drawing, which of course are the beam directions first indicated in FIG. 1 of the drawing. The polarization of the individual elements is indicated by plus and minus signs, as was previously explained with reference to FIG. 17 (except that in FIG. 17 the hydrophone is drawn horizontally, whereas in FIG. 27 the hydrophones are drawn vertically). In most cases it is doubtful whether the added inconvenience of using two kinds of hydrophones would be justified by the elimination of four transformers. However, in some situations the simplification in cabling on the bottom of the ship is worthwhile.

In FIG. 17 the two isolating resistors shown are built as part of the hydrophone, with a shield and three output leads, these being A, B, and ground.

As shown in FIG. 18, a common cable with these same leads goes to all odd numbered hydrophones, with individual hydrophone connectors permitting all such hydrophones to be connected in parallel (assuming that the hydrophones are numbered consecutively along the array). A second cable goes to all even numbered hydrophones. This results in the overall cabling scheme of FIG. 19, where each of the two cables in FIG. 19 really comprises three leads and a shield as shown in FIG. 18.

The technique illustrated in FIG. 14 for using resistors to provide inputs to both the echo sounder and the Doppler beam forming circuits, makes the assumption that the internal impedance of the hydrophone elements is low enough in comparison with acceptable resistance values so that the resistance loading does not alter the hydrophone voltages unduly. If it is not possible to realize this impedance, it is necessary to provide preamplifiers for additional isolation. The most obvious solution is to provide an individual preamplifier at each of the four output terminals of each hydrophone before entering the resistance network of FIG. 14. However, a simpler solution is to provide a single preamplifier at the echo sounder output lead from each hydrophone. The eight resistors and the single preamplifier required for each hydrophone can be built integral with the hydrophone. The resistors going to the echo sounder can then be chosen with a much higher resistance value since they can work directly into a preamplifier instead of driving a long cable. The resistors connected to the Doppler navigator can be made high in any case since a large number are connected to a common terminal with relatively short connections between hydrophones.

If the size and shape of the ship do not permit a plane receiving array it may be bent up to conform to the hull. The preferred configuration is one in which the short fore and aft rows or hydrophones remain parallel to the keel and to each other but the various hydrophones are arranged in a curve conforming to the cross section of the hull. With this configuration one can still take advantage of the 90° phasing in the fore and aft direction to restrict the number of output leads per hydrophone as already described. However, it will not usually be possible to combine the leads from different hydrophones as was described for a planar array. Instead all leads are brought out to the phasing network. This network is of conventional type. To form a beam in any specified direction a specified phase shift is introduced in each lead from the array and the resulting signals are combined in a single channel. As many output channels can be formed as desired including four for the four Doppler beams plus additional channels for an echo sounder or bottom mapping equipment if desired.

The number of leads required per hydrophone and for an array of N hydrophones either planar or conformal used for Doppler reception with and without provision for bottom mapping is shown in the following table for three phase and four phase beam forming:

| Array shape | Application | | 3φ | | 4φ | |
|---|---|---|---|---|---|---|
| | Doppler | Mapping | Hydrophone | Array | Hydrophone | Array |
| Planar | X | | 3 | 9 | 2 | 4 |
| | X | X | 4 | N+9 | 5 | N+8 |
| Conformal | X | | 3 | 3N | 2 | 2N |
| | X | X | 3 | 3N | 4 | 4N |

Not counted in the above tabulation is a common ground return and a separate shield if desired.

The four phase hydrophones in the first and third rows of the table are illustrated in FIG. 17 and that in the fourth row in FIG. 11. The four phase array wiring in the first row is shown in FIG. 27 and that in the second row in FIG. 14. In the latter figure only three of the N leads to the echo sounder and only two of the eight leads to the Doppler receivers are shown. The four phase hydrophone wiring corresponding to row two of the table may be understood from FIG. 14 where the hydrophone represented by the first four elements A, B, C, D on the left has one lead going to the echo sounder and four leads going to the Doppler of which only lead $D_0$ is shown while three other similar leads are connected through resistors to elements A, B and C. The three phase hydrophone for rows one, three and four is similar to that of FIG. 11 but has only three terminals. The three phase hydrophone for row two is wired like those in FIG. 14 with one lead to the echo sounder but only three leads to the Doppler receivers.

It is evident from the table that three phase wiring has some advantage if the receiving array is also to be combined with bottom mapping equipment. On the other hand, the four phase technique insures better discrimination between fore and aft receiving beams. Hence, each has advantages.

In detecting an echo from a deep ocean bottom one problem is to get enough energy back to over-ride background noise, and another is to distinguish the bottom echo from energy scattered by particles suspended in the water, called volume reverberation. It is necessary to eliminate volume reverberation from the signal if the Doppler navigator is to register true velocity with respect to the bottom, rather than velocity relative to the water which is subject to unpredictable currents.

In echo sounding it is relatively easy to eliminate volume reverberation by transmitting short pulses and using a receiver with a gate or time varied gain which suppresses the strong volume reverberation occurring during the early portion of the receiving cycle. The volume reverberation occurring a little later at the time the bottom echo returns is low enough not to be troublesome.

With the Doppler navigator, the problem is more severe since it is necessary to measure the echo frequency with high precision, and this requires relatively long pulses. In fact, continuous transmission is desirable to avoid gaps in the velocity information.

It is desirable to measure frequency with an accuracy of the order of one tenth of one cycle per second. The pulse length required for this accuracy depends on the signal to noise ratio. However, for reasonable values the pulse length should be of the order of the reciprocal of the frequency accuracy required, that is, several seconds. In water of 2000 fathoms depth, the round trip travel time for the acoustic pulse at 820 fathoms per second and making an angle of 41.6° to the vertical as mentioned above, is 2×2000/820 cos 41.6°=6.54 seconds.

If we are to gate out reverberation, the pulse length must be considerably less than this. In FIG. 20 a pulse $X_1$ of length T is transmitted, followed by a period D to allow the decay of volume reverberation, after which the signal R is received. The round trip travel time of the echo is $E=D+T$. After the echo is received, a second transmission $X_2$ can be initiated. Pulse transmissions are repeated with a period P which must exceed $$E+T=D+2T$$

We will take as a design requirement that the time D allowed for decay of reverberation exceeds one half the pulse length T. At a depth of 2000 fathoms where the round trip echo time $E=D+T=(3/2)T$ has a value of about 6.5 seconds, which allows a pulse length $T=6.5/1.5=4.33$ seconds. The pulse repetition period must exceed the value $P=E+T=10.8$ seconds. With this repetition rate, one receives Doppler information about 40% of the time. If one makes allowance for pitch and roll and uncertainties due to bottom contour, P must be increased, and the information rate drops further. Although this rate may still be adequate in some applications, greater accuracy is always desirable.

Continuous reception can be achieved by transmitting pulses on different frequencies, so that the signal being received at any one instant can be distinguished by appropriate filtering from the cross talk and volume reverberation due to concurrent or recent transmission on a different frequency. If one uses three frequencies for example, these may be keyed to give three successive pulses each 4 seconds long for a total of 12 seconds, permitting continuous transmission with a 12 second frequency keying cycle.

This would satisfy the requirement that the period exceed 10.8 seconds. However, one must allow for the reception on four different beams of signals which may not all arrive simultaneously. The first arrival which we will assume occurs on beam M at time $E_1$ must satisfy the reverberation condition $D+T=E_1$ with $D$ greater than $T/2$. The last arrival assumed to occur at time $E_3$ on beam Q, diagonally opposite beam M, must satisfy the requirement that $E_3+T$ be less than the transmission period P. Hence to make P large enough it is desirable to use four frequencies rather than three. This is shown in FIG. 21.

With continuous transmission, the maximum permissible value of the ratio $$a=E_3/E_1 \qquad (19)$$

is $$a=(P-T)/(D+T) \qquad (20)$$

With N frequencies, the transmission repetition period is $$P=NT \qquad (21)$$

and the slant range ratio is $$a=(N-1)/(1+D/T) \qquad (22)$$

For $D/T=\frac{1}{2}$ and $N=4$, this gives $a=2$.

The relation between bottom slope $$m=\tan \alpha \qquad (23)$$

and slant range ratio $a$ is derived from FIG. 22 which is drawn for the case of two diagonally opposite beams which for simplicity are assumed to make angles of 45° with the vertical rather than the more exact value of 41.6° discussed above.

With the ship at S the slant ranges on the two beams are $r_1$ and $r_3$ and the corresponding depths are $z_1$ and $z_3$. It follows from the figure that the range ratio is $$a=r_3/r_1=z_3/z_1 \qquad (24)$$

and the bottom slope tangent is $$m=(z_3-z_1)/(z_3+z_1) \qquad (25)$$

so that $$m=(a-1)/(a+1) \qquad (26)$$

For the range ratio $a=2$, we get a bottom slope $m=\frac{1}{3}$ or a slope angle $\alpha=18.4°$. This represents the mean slope between two targets on diagonally opposite beams and is the maximum value accommodated with four frequencies if the time allowed for decay of volume reverberation is one half of the pulse length. With five frequencies instead of four, we could accommodate average slopes up to 24.4°.

The horizontal separation between target points is nearly twice the mean depth, or four miles at 2000 fathoms. Areas of the bottom where the mean slope exceeds 18° for four miles are not common.

There is still the problem of the change in slant range due to roll. I have computed that combinations of roll and pitch can occur which permit a slant range as large as twice the depth on a flat bottom. The minimum slant range, if one ignores yaw and pitch, is obtained by using the following equation $$\cos C=\cos \mu \cos \tau \qquad (27)$$

with
$\mu=\mu_0=28°$, $\tau_0=32.1°$, roll=15°, $\tau=\tau_0-$roll=17.1° so that $\cos C=0.844$. The ratio of slant range to depth is $1/\cos C=1.18$. Hence the ratio of maximum to minimum slant range for a roll of +15° over a flat bottom is nearly $a=2$.

The apparatus can accommodate maximum roll over a flat bottom of up to 18° of slope in the absence of roll, but a rare combination of large slopes and roll angles could be troublesome. It is desirable to gate the receivers to permit as large a range variation as possible, but the equipment should be designed to accommodate occasional loss of signal. If the output circuit of the receiver is a phase lock loop, this can be done by making provision for the local oscillator to hold frequency when the signal drops out.

Frequency keying raises the question of the dependence of the Doppler measurement on frequency. In this respect, it turns out that the use of phased arrays has an important advantage.

To see this, consider dual beams as in FIG. 4 and Equation 8. These give the Doppler frequency shift $$f_d=4V_s(\cos B)/\lambda \qquad (28)$$

when the velocity component along the ship's axis is $V_s$. Integrating this gives the total Doppler cycle count over a specified period as $$N=4s(\cos B)/\lambda \qquad (29)$$

where $s$ is the distance traveled in this time. This count represents the signal arriving along the axis of the beam where Equation 13 holds, $$(\cos B)/\lambda=\phi/2\pi b \qquad (30)$$

Using this in Equation 29 and solving for $s$ gives $$s=(\pi b/2\phi)N \qquad (31)$$

This equation states that distance traveled is proportional to the Doppler cycle count and the proportionality factor $(\pi b/2\phi)$ is independent of frequency provided the beam forming circuits are designed so that the phase shift $\phi$ is independent of frequency. This is readily done if the required frequency range is not too large. In fact, the proportionality factor depends only on $\phi$ and the element spacing $b$, and is therefore independent of the velocity of sound in the water. This is a considerable advantage over Doppler navigators which use a fixed beam direction determined by the mechanical orientation of an unphased transducer. For such systems it is necessary to know the sound velocity precisely, and this is usually monitored by a separate instrument. On the other hand, the beam direction from a phased array varies with frequency and sound velocity, so as to keep the Doppler frequency fixed for a specified velocity of the ship. If the array uses a four phase beam forming circuit, we have $\phi=\pi/2$ and Equation 31 reduces to $$s=Nb \qquad (32)$$

The distance traveled in each Doppler cycle is equal to the spacing between elements in the array.

Equation 31 may be derived directly from first principles. Consider a single beam system with a transmitter on the moving ship and a stationary receiver in the water. One counter measures the number of cycles $f_0t$ transmitted in time $t$, and another the number $f_rt$ received in the same interval. The one way, one beam Doppler count is the difference between the two counters. We call $s_0$ the distance AB traveled by the ship in the time during which the Doppler count is exactly one cycle as in FIG. 23. The wave fronts through A and B are FA and GB perpendicular to the direction AG of the beam axis. The distance AG then equals the wavelength $\lambda$. This distance represents the single Doppler cycle that the receiver picks up while the ship moves from A to B, that is, the receiver counts the $f_0t$ cycles transmitted during this time plus the cycle already in the water.

The triangle A'B'G' in FIG. 24 represents the beam forming geometry with $b$ indicating the spacing between two adjacent transducer elements A' and B', and $d$ indicating the distance traveled by the wave in a time corresponding to the phase shift $\phi$ between A' and B'. This correspondence is given by the equation $$d/\lambda=\phi/2\pi \qquad (33)$$

The similarity of the two triangles gives $$s_0 = b\lambda/d \tag{34}$$

or $$s_0 = 2\pi b/\phi \tag{35}$$

The distance traveled during N Doppler cycles is $Ns_0$ or $$s = (2\pi b/\phi)N \tag{36}$$

With the receiver mounted on a ship instead of stationary, we get a round trip Doppler shift which is twice as great, and if there are dual fore and aft beams we get another factor of two. Applying the total factor of four gives Equation 31.

It will be seen that the use of phased arrays therefor greatly reduces the effect of variations in frequency and sound velocity.

A received signal processing scheme is next outlined for a Doppler navigator using continuous transmission keyed on four different frequencies as explained above. A scheme similar to that described here could, however, be used for any number of transmitted frequencies. We can take as a typical Doppler shift a value of 3.7 Hz. per knot. Hence allowing for a range of $-5$ to $+22$ knots, we need a bandwidth of $27 \times 3.7 = 100$ Hz. We select four transmitting frequencies at intervals of 200 Hz. which we denote by $T_1$, $T_2$, $T_3$ and $T_4$. If the band is centered at 10.7 kHz. as assumed in previous sections, this requires $T_1 = 10,400$, $T_2 = 10,600$, $T_3 = 10,800$, $T_4 = 11,000$ Hz.

For reception on any one beam we must first identify each of the four received signals corresponding to the four transmissions and gate each one to accept the signal and suppress reverberation. The four signals for one beam must also be shifted to a common frequency so that they can be combined to give a continuous output for that beam channel. In mixing signals from the different beam channels it is necessary to preserve the algebraic sign of the Doppler frequencies. We, therefore, introduce a local oscillator frequency $L$, and generate as the output of each beam channel a signal of frequency $L+f$.

FIG. 25 shows the processing on one beam channel. The designation MX indicates a mixer, GA a gate, and FL a filter. One begins by mixing the local oscillator frequency $L$ with each of the transmitted frequencies $T_1$, $T_2$, $T_3$ and $T_4$ (see these oscillators also in FIG. 5) to produce four reference frequencies $$F_n = T_n - L \quad (n = 1, 2, 3, 4) \tag{37}$$

We set the local oscillator frequency at say $L = 4$ kHz. (The exact value might be chosen differently to simplify filtering, minimize unwanted harmonics or for other reasons.) Since the $T_n$ are roughly at 11 kHz., the $F_n$ are at about 7 kHz.

The output from the selected beam channel of the beam forming circuit, say channel M of FIG. 15, has four component frequencies $$R_n = T_n + f \quad (n = 1, 2, 3, 4) \tag{38}$$

where $f$ is the Doppler shift for that beam. (Only one component is present at a time.) This signal goes to an R-F amplifier of bandwidth about 10,300 to 11,100 Hz., sufficient to accommodate all of the frequencies $R_n$. (See R-F amplifier 22M in FIG. 5.)

The output of the R-F amplifier is applied to four different channels for processing the four component frequencies $R_1$, $R_2$, $R_3$ and $R_4$. The first stage in the $R_1$ channel is a gate GA (31) which is turned off when $T_1$ is being transmitted and for sufficient time thereafter to allow decay of reverberation. The gate is then turned on and left on until just prior to the beginning of the next $T_1$ transmission. The next stage is a filter FL (41) of about 100 Hz. bandwidth to isolate $R_1$ from the other signals. Although final filtering is done in the I-F stage it is desirable to use R-F filtering as well to prevent overloading the mixers by the signal being transmitted at the time the gate is open.

The filter outputs $R_n$ are mixed in mixers MX (51-54) with the reference frequency $F_n$ to produce a signal of frequency $$P_n = R_n - F_n \tag{39}$$

It follows from the above equations that all the $P_n$ signals from one beam have the same frequency $$P = L + f \tag{40}$$

The four signals $P_1$, $P_2$, $P_3$ and $P_4$ from beam A are therefore combined in a single output by a resistance summing network. The same is done for each of the other three beams.

The four outputs from FIG. 25 are treated as shown in FIG. 26. The input M in that figure represents the signal from beam M, which at this point has the frequency $$P_M = L + f_M \tag{41}$$

where $f_M$ is the Doppler shift on beam M. Likewise N is a signal of frequency $P_N = L + f_N$, etc. These are processed in I-F amplifiers 70 where final filtering is accomplished. For maximum signal to noise ratio a phase lock loop 71 may be used at this point since the signal consists of a narrow band spectrum with center frequency which shifts slowly as the ship accelerates. Phase lock loops are known. See for example the book "Phase Lock Techniques," by Floyd M. Gardner, published by John Wiley & Sons (1966), or the article, "Phase-Locked Loop Dynamics," Viterbi, Proceedings of the IEEE (vol. 51, #12) December 1963, p. 1737. The phase lock loop permits a frequency band narrower than the 100 Hz. band which would be required to accommodate all possible Doppler frequencies if a conventional fixed tuned filter were used. The permissible lower limit to the effective bandwidth of the phase lock loop is determined by the spectral bandwidth due to the beam width, and by the rate of change of frequency due to acceleration or attitude changes. This bandwidth will be only a fraction of the total required for the complete range of Doppler frequencies on any one beam.

It should also be noted that the arrow I-F band further reduces the effect of any volume reverberation. Suppose for example that at a particular instant the projector is transmitting on frequency $T_1$ and the bottom signal is received on frequency $R_3 = T_3 + f$ corresponding to a previous transmission on frequency $T_3$. At this time the receiving channel for frequency number one is gated off, and any cross talk or volume reverberation due to $T_1$ which is processed by channels 2, 3 or 4 will be shifted to frequencies outside the I-F pass band.

After narrow banding by the I-F amplifier and by the phase lock loop, the signal on each beam is squared up in circuits 72 to form a train of standard pulses of frequency $P_M$, $P_N$, etc. (FIGURE 5 also shows amplifiers 70, phase lock loops 71, and squaring circuits 72.)

According to Equation 9 we now want to generate the frequency $$f_s = f_M + f_N - f_P - f_Q$$

representing the along-ship velocity component. This is done by applying the pulse trains to a differential counter. The M and N signals are applied to the positive input terminals of the counter and the P and Q signals to the negative input terminals, as shown in FIGS. 5 and 26. The counter outputs pulse at a rate $|f_s|$ and these pulses appear on the positive or negative output terminal depending on whether $f_s$ is positive or negative.

The differential counter is a simple memory device capable of assuming several states equal in number to the number of input terminals, in this case four. The appearance of a pulse at one of the positive input terminals raises the counter one level if it is in state one, two or three. If the counter is at level four, the state remains unchanged but a pulse is emitted at the positive output terminal. Likewise, the appearance of a pulse at one of the negative input terminals depresses the counter one level if it is in state two, three, or four. If it is at level one the state remains unchanged but a pulse is emitted at the negative output terminal. In its practical form, the inputs and outputs are buffered in such a way that when two or more pulses arrive simultaneously at different inputs, no pulses are lost, and the output pulses will not bunch up so that the computer fails to resolve them. The input to the counter is $P_M + P_N - P_P - P_Q$ but the common frequency L cancels out leaving $f_M + f_N - f_P - f_Q$ as desired.

The athwartship velocity component is determined in the same way by inputting N and Q channels at the positive terminals of a counter, and M and P channels at the negative terminals, to get the output $f_a$ in accordance with Equation 10.

The vertical velocity component is a little different since we need to input $4L - P_M - P_N - P_P - P_Q$ in order to get $f_n$ according to Equation 11, that is, the L components do not cancel out, and it is necessary to enter L at the four positive terminals. Since there are eight input terminals, this channel has an eight state counter.

The outputs to the computer are the three positive and three negative channels with the pulse trains of frequency $f_s$, $f_a$, $f_n$ proportional to the velocity components along the three ships' axes. The three counters are also shown in FIG. 5.

They are next described.

The differential counter may be explained as follows. It has $n$ positive input terminals and $k$ negative input terminals plus one positive and one negative output terminal. Pulse trains of frequencies $f_1, f_2, f_3 \ldots f_n$ are applied to the positive input terminals and $g_1, g_2, g_3 \ldots g_k$ to the negative input terminals. The net input frequency is $$F = f_1 + f_2 + \ldots + f_n - g_1 - g_2 \ldots g_k$$

We want to generate an output pulse train of frequency F at the positive output terminal when F is positive, and at the negative output terminal when F is negative.

The counter can assume a finite number $S_0$ of states designated as $S = 1, 2, 3 \ldots S_0$. Whenever a pulse appears at one of the positive input terminals the state is raised one level unless $S = S_0$ in which case it remains at $S_0$ but emits a pulse at the positive output terminal. Whenever a pulse appears at one of the negative input terminals, the state is depressed one level unless $S = 1$ in which case it remains at 1 and a pulse is emitted at the negative output terminal.

We want to determine an appropirate design value for $S_0$ and show that the net output pulse count differs from the net input count by not more than $S_0 - 1$.

Suppose at some instant $t = 0$, the counter is in an initial state $S_1$. At some later time T it is in state $S_2$. Let $P_1$ be the number of pulses into the $f_1$ terminal, during this time, $P_2$ the number into the $f_2$ terminal, $M_1$ to the $g_1$ terminal, $M_2$ to the $g_2$ terminal, etc. Then $$P = P_1 + P_2 \ldots + P_n \quad (44)$$

is the total number of positive input pulses, and $$M = M_1 + M_2 + \ldots + M_k \quad (45)$$

is the total number of negative input pulses. Likewise let $p$ be the total number of output pulses on the positive output terminal and $m$ the total number on the negative output terminal. It is clear that $$S_2 = S_1 + (P - p) - (M - m) \quad (46)$$

$$(p - m)/T = (P - M)/T + (S_1 - S_2/T) \quad (47)$$

where the magnitude of the second term on the right is less than $S_0/T$. The net output frequency $(p - m)/T$ therefore differs from the net input frequency $(P - M)/T$ by a term which approaches zero for a large T. At any instant there is an error in distance traveled represented by $$S_1 - S_2 = (p - m) - (P - M) \quad (48)$$

the difference between the algebraic total of the input pulses and that of the output pulses. This error cannot exceed $S_0 - 1$.

In general, therefore, we wish to keep $S_0$ as small as possible to reduce the error and the amount of hardware. A second requirement is that under steady state conditions we want to have output pulses at only one of the two output terminals, in order to minimize the number of computer interrupts, that is, we want to choose $S_0$ as small as possible without increasing the number of output pulses.

Assume first that $F \leq 0$. We want to choose $S_0$ so that no pulses appear at the positive output terminal under steady state conditions. Then $p = 0$ and $$S_2 - S_1 = P - M + m \quad (49)$$

Now the total number of pulses into positive input terminal $i$ is $$P_i = Tf_i + \Delta_i \quad (50)$$

where $|\Delta_i| < 1$. The number into negative input terminal number $i$ is $$M_i = Tg_i + \delta_i \quad (51)$$

where $|\delta_i| < 1$. Hence we have $$S_2 - S_1 = T(f_1 + f_2 + \ldots + f_n) + \Delta_1 + \Delta_2 + \ldots + \Delta_n$$
$$- T(g_1 + g_2 + \ldots + g_k) - \delta_1 - \delta_2 - \ldots - \delta_k + m \quad (52)$$

or $$S_2 - S_1 = TF + \Delta_1 + \Delta_2 + \ldots + \Delta_n - \delta_1 - \delta_2 - \ldots - \delta_k + m \quad (53)$$

The term TF does not exceed zero and the sum of the remaining term is less than $n + k + m$. Hence $S_2 - S_1$ is less than $n + k + m$. But $S_2 - S_1$ is an integer. Hence if no negative pulses are emitted during the interval so that $m = 0$ we have $$S_2 - S_1 \leq n + k - 1 \quad (54)$$

Once the counter has emitted a pulse at the negative output terminal and thus attained state $S_1 = 1$, the maximum level can never exceed $$S_{max} = n + k - 1 + S_1 = n + k \quad (55)$$

Hence if we choose $$S_0 = n + k \quad (56)$$

the counter will never output a positive pulse once the first negative pulse is emitted and provided F does not exceed zero. Following a transient, in the worst case it could output no more than $n + k - 1$ positive pulses before a negative pulse is emitted.

The case $F \geq 0$ leads to the same requirement, $S_0 = n + k$.

The conclusion is that the number of states will suffice if it is equal to the total number of input terminals. Incidentally, the above also shows that when $F = 0$ there will be no output pulses at all after steady state conditions are reached. This shows that a number of states $S_0 = n + k$ is sufficient. I have similarly found that this number is necessary as well as sufficient.

The computer supplies timing signals for keying the transmitter frequencies and operating the gates in the receivers. The timing is based on a cycle determined by the depth or distance from the ship to the bottom. If the Doppler navigator is operated in conjunction with a bottom mapping equipment, the latter will provide the necessary information on bottom depth. If not, there are two other alternatives: a simple depth sounder of conventional design using a separate small transducer on a different frequency; or hardware for measuring the time of signal arrival on one or more beam channels of the Doppler receivers. The latter method has the disadvantage that the slant ranges on the Doppler beams vary because of ship's roll. Also the transmitted power required to operate the Doppler beams as echo sounders is much greater than that otherwise needed. This is because the effective noise bandwidth of a receiver required for Doppler can be made much narrower than that required for echo sounding.

It may be assumed for the present that an auxiliary depth sounder is provided and the depth reading is encoded and transmitted to the computer used for the Doppler data processing. Using the calculations above it is found that the slant range varies from 1.12 to 2.24 times the depth (as read by a wide beam echo sounder) if the variation is due to a maximum permissible bottom slope in the absence of roll, or from about 1.18 to 2 if it is due to maximum roll in the absence of bottom slope. Hence the pulse repetition period P should be selected to permit an echo roundtrip time E equal to 2.1 times the value $E_0$ observed on the echo sounder. But $P=E+T$ where $T=P/4$ is the pulse length for one frequency. Hence the period is $P=(4/3)E=(4/3)2.1E_0$ or $$P=2.8E_0$$

This is the total repetition period to be used. Each frequency is transmitted for one quarter this time or $T=0.7E_0$. Following the transmission of a particular frequency an interval $D=T/2=0.35E_0$ is allowed for reverberation decay. The gates for that frequency channel are then turned on and left on until just prior to the next transmission of this frequency.

The Doppler computer must determine ship's velocity or distance traveled, given the Doppler frequency shifts on the four beams, or the Doppler difference frequencies $f_s$, $f_a$, $f_n$ representing velocities along the ship's three axes. There may be a change in ship's position, attitude and velocity between transmission and reception. In shallow water Doppler systems, where the round trip echo time is short, this effect can be ignored, and the observed difference frequencies $f_s$, $f_a$ and $f_n$ give directly the velocity components along the ship's axes. Given the ship's attitude (roll, pitch and heading values), these velocities can then be resolved at once into components along the earth coordinates north, east and vertical.

For deep water navigation this procedure would still give good accuracy because the variations in roll, pitch and yaw are of a quasi periodic nature, and their effects on the Doppler frequencies tend to average out over periods longer than one or two minutes.

However, if instantaneous velocity readings or very precise average velocities are desired the computer can be programmed to make a more sophisticated calculation as follows. Knowing the ship's velocity at transmission, we can calculate the Doppler shift occurring at that time and subtract it from the observed value to get the shift occurring at reception. The latter then allows computation of the velocity at reception. As an approximation to the velocity for the initial period, one can use the apparent velocity obtained by ignoring the round trip echo time.

It is evident that this is an iterative type of calculation with the velocity $V(t)$ computed at any one instant $t$ stored in the memory, and $t_e$ seconds later used as one of the input data to a calculation of a new velocity $V(t+t_e)$, where $t_e$ is the round trip echo time. This is repeated indefinitely to find the velocity at all times. The computer memory holds data on the velocity history during the last $t_e$ seconds, adding the latest data and dropping the old as time goes by. It is possible that instrumentation and computation errors could accumulate, and it may therefore be desirable to introduce some damping in the calculation so as to counteract any tendency for the computed velocity to depart too far from the "apparent" velocity, the value obtained from the Doppler data by ignoring the echo delay time.

One further complication may be noted. Because of the change in ship's position from transmission to reception the path of the transmitted ray from the ship to the bottom differs slightly from that of the received ray from the bottom back to the ship. In particular, the direction of the transmitted ray as it leaves the ship differs slightly from that of the received signal. The simplest solution is, of course, simply to ignore the change in position, and usually the resulting accuracy will be adequate. If greater accuracy is needed, one can use the apparent velocity to compute the position change. For still higher accuracy, the computed velocity could then be used to get an improved position change, but it is extremely doubtful that this would be necessary.

It is believed that the construction, theory, and method of operation of my improved fan beam acoustic Doppler navigation system, as well as the advantages thereof for use in deep water, will be apparent from the foregoing detailed description. It will also be apparent that while I have shown and described the invention in a preferred form, changes may be made without departing from the scope of the invention, as sought to be defined in the following claims. In the claims the reference to using the difference in frequency between the transmitted beam and the received beam (as when using only one beam intersection) is not intended to exclude using the difference between received frequencies directly, as explained above, because the transmission frequency cancels out when using multiple beam intersections.

I claim:

1. A Doppler type velocity measuring system for use by vessels, said system comprising transducer means for projecting a fan beam, a receiving transducer or hydrophone means for receiving a fan beam which fans in a direction transverse to that of the transmitted beam and which crosses the transmitted beam, the intersection of said fan beams being disposed at an angle to the vertical, and receiver means responsive to a Doppler difference in frequency, said receiver means serving to determine the velocity of the vessel.

2. A system as defined in claim 1, in which there is an array of transmitting transducers disposed fore-and-aft or in keel direction to produce a fan beam which fans athwartship, and in which there is an array of hydrophones disposed athwartship to provide a receiving fan beam which fans fore-and-aft or in keel direction.

3. A system as defined in claim 2, in which there are two fan beam intersections, one of said fan beam intersections pointing forward of the vertical, and the other of said fan beam intersections pointing aft of the vertical, so that the receiver determines the velocity of the vessel in fore-and-aft or tracking direction.

4. A system as defined in claim 2, in which there are two fan beam intersections, one of said fan beam intersections pointing away from the vertical in starboard direction, and the other of said fan beam intersections pointing away from the vertical in port direction, so that the receiver determines the drift or sideward velocity of the vessel.

5. A system as defined in claim 2, in which there are four such fan beam intersections, one of said intersections pointing away from the vertical in forward starboard direction, another of such intersections pointing away from the vertical in forward port direction, another of such intersections pointing away from the vertical in aft port direction, and the fourth of said intersections pointing away from the vertical in aft starboard direction.

6. A system is defined in claim 5, in which there is only one array of transmitting transducers disposed fore and aft, and one array of hydrophones disposed athwartship, and in which there are beam steering means associated with each array and utilizing phase difference between the transducers in the array for steering the transmitting beam forward and aft and for steering the receiving beam toward port and starboard, thus providing the desired four fan beam intersections, while using only two transducer arrays.

7. A system as defined in claim 6, in which a continuous signal is transmitted and in which there is keying means which changes the transmitted frequency cyclically, and in which the receiver has means to select the received frequencies, means to gate the selected frequencies to minimize the effect of reverberation, and means to convert them to a common frequency for use in counters.

8. A system as defined in claim 6, in which the transmitting array is a one-dimensional or linear array with successive elements connected in alternate polarity to a single pair of terminals to generate a response pattern having two fan-shaped beams.

9. A system as defined in claim 8, in which the receiving array is a two-dimensional or planar array with 90° phasing and all elements connected to four terminals plus a common return, thereby providing four fan beams for four intersections with the transmission fan beams.

10. A system as defined in claim 6, in which the receiving array is a two-dimensional or planar array with 90° phasing and all elements connected to four terminals plus a common return, thereby providing four fan beams for four intersections with the transmission fan beams.

11. A system as defined in claim 6, in which the receiving array is a two dimensional array with array elements disposed in parallel lines fore and aft with 120° phasing in the fore and aft direction so that all elements in each fore and aft line can be connected to only three terminals.

12. A system as defined in claim 1, in which there are two fan beam intersections, one of said fan beam intersections pointing forward of the vertical, and the other of said fan beam intersections pointing aft of the vertical, so that the receiver determines the velocity of the vessel in fore-and-aft or tracking direction.

13. A system as defined in claim 1, in which there are two fan beam intersections, one of said fan beam intersections pointing away from the vertical in starboard direction, and the other of said fan beam intersections pointing away from the vertical in port direction, so that the receiver determines the drift or sideward velocity of the vessel.

14. A system as defined in claim 1, in which there are four such fan beam intersections, one of said intersections pointing away from the vertical in forward starboard direction, another of such intersections pointing away from the vertical in forward port direction, another of such intersections pointing away from the vertical in aft port direction, and the fourth of said intersections pointing away from the vertical in aft starboard direction.

15. A system as defined in claim 14, in which there is only one array of transducers disposed fore and aft, and one array of transducers disposed athwartship, and in which there are beam steering means associated with each array and utilizing phase difference between the transducers in the array for steering one beam forward and aft, and for steering the other beam toward port and starboard thus providing the desired four fan beam intersections, while using only two transducer arrays.

16. A system as defined in claim 1, in which a continuous signal is transmitted and in which there is keying means which changes the transmitted frequency cyclically, and in which the receiver has means to select the received frequencies, means to gate the selected frequencies to minimize the effect of reverberation, and means to convert them to a common frequency for use in counters.

17. A system as defined in claim 15, in which the transmitting transducer array is a one-dimensional or linear array with successive elements connected in alternate polarity to a single pair of terminals to generate a response pattern having two fan-shaped beams.

18. A system as defined in claim 17, in which the receiving array is a two-dimensional or planar array with 90° phasing and all elements connected to four terminals plus a common return, thereby providing four fan beams for four intersections with the transmission fan beams.

19. A system as defined in claim 15, in which the receiving array is a two-dimensional or planar array with 90° phasing and all elements connected to four terminals plus a common return, thereby providing four fan beams for four intersections with the transmission fan beams.

20. A system as defined in claim 15, in which the receiving array is a two dimensional array with array elements disposed in parallel lines fore and aft with 120° phasing in the fore and aft direction so that all elements in each fore and aft line can be connected to only three terminals.

21. A Doppler system as defined in claim 3, characterized in that there is only one array of transmitting transducers disposed fore-and-aft, and in which there are beam steering means associated with the transmitting array and utilizing phase difference between the transducers in the array for steering the transmitting beam forward and aft, thus providing the desired two fan beam intersections.

22. A Doppler system as defined in claim 4, characterized in that there is only one array of hydrophones disposed athwartship, and in which there are beam steering means associated with the hydrophone array and utilizing phase difference between the transducers in the array for steering the receiving beam toward port and starboard, thus providing the desired two fan beam intersections to determine drift or sideward velocity.

References Cited
UNITED STATES PATENTS

| | | | |
|---|---|---|---|
| 3,222,673 | 12/1965 | Friedrich | 343—8 |
| 3,257,638 | 6/1966 | Kritz et al. | 340—3 |

RICHARD A. FARLEY, *Primary Examiner.*

U.S. Cl. X.R.

343—9